US012632508B1

(12) United States Patent
Wallström et al.

(10) Patent No.: US 12,632,508 B1
(45) Date of Patent: May 19, 2026

(54) BATCHED BOUNDARY CUT GENERATOR

(71) Applicant: Chicago Mercantile Exchange Inc., Chicago, IL (US)

(72) Inventors: Karl Wallström, Enköping (SE); Ariyan Abdulla, Stockholm (SE); Carl Erik Thornberg, Stockholm (SE); Daniel Ward, Solna (SE)

(73) Assignee: Chicago Mercantile Exchange Inc., Chicago, IL (US)

( * ) Notice: Subject to any disclaimer, the term of this patent is extended or adjusted under 35 U.S.C. 154(b) by 1022 days.

(21) Appl. No.: 17/830,699

(22) Filed: Jun. 2, 2022

Related U.S. Application Data

(60) Provisional application No. 63/208,323, filed on Jun. 8, 2021.

(51) Int. Cl.
    *G06F 17/11*      (2006.01)
    *G06F 17/17*      (2006.01)
                 (Continued)

(52) U.S. Cl.
    CPC ............ *G06F 17/11* (2013.01); *G06F 17/175* (2013.01); *G06Q 40/04* (2013.01); *G06Q 40/06* (2013.01)

(58) Field of Classification Search
    CPC ....... G06F 17/11; G06F 17/175; G06Q 40/04; G06Q 40/06; G06Q 40/042; G06Q 40/0421; G06Q 40/043; G06Q 40/0431; G06Q 40/0432; G06Q 40/044; G06Q 40/045; G06Q 40/0451; G06Q 40/046; G06Q 40/047; G06Q 40/048; G06Q 40/049; G06Q 40/05; G06Q 40/051; G06Q 40/052; G06Q 40/0525; G06Q 40/053; G06Q 40/054; G06Q 40/0545; G06Q 40/055; G06Q 40/062; G06Q 40/063; G06Q 40/0631;
                 (Continued)

(56) References Cited

U.S. PATENT DOCUMENTS 8,156,038 B2    4/2012   Brouwer
8,301,552 B2   10/2012   Brouwer
              (Continued)

FOREIGN PATENT DOCUMENTS

EP          1232461 A1     8/2002

OTHER PUBLICATIONS

Safe Exploration in Continuous Action Spaces (Year: 2018).*
              (Continued)

*Primary Examiner* — Mohamed Abou El Seoud
(74) *Attorney, Agent, or Firm* — Lempia Summerfield Katz LLC

(57)            ABSTRACT

The disclosed embodiments relate to systems and methods calculation of an estimation solution for a constraint polytope. The apparatus may include a database, a communication interface, and a polytope controller. The database stores data indicative of a constraint polytope. The communication interface is configured to receive a first point batch from an external computer system, and the first point batch includes a plurality of data points representing transactions. The polytope controller analyzes the plurality of data points and performs a projection of the plurality of data points to the constraint polytope and generates a dynamic adjustment for a second point batch for the constraint polytope.

21 Claims, 17 Drawing Sheets

1. Process overview

(51) Int. Cl.
    *G06Q 40/04*      (2012.01)
    *G06Q 40/06*      (2012.01)
(58) Field of Classification Search
    CPC .. G06Q 40/064; G06Q 40/065; G06Q 40/066;
                          G06Q 40/067; G06Q 40/068
    See application file for complete search history.

(56)                References Cited

U.S. PATENT DOCUMENTS

| | | | |
|---|---|---|---|
| 2011/0264612 A1* | 10/2011 | Ryman-Tubb ..... | G06Q 20/4016 |
| | | | 706/12 |
| 2011/0276460 A1 | 11/2011 | Brouwer | |
| 2012/0127893 A1 | 5/2012 | Binder | |
| 2012/0303509 A1 | 11/2012 | Brouwer | |
| 2014/0006243 A1 | 1/2014 | Boudreault et al. | |
| 2014/0081820 A1* | 3/2014 | Farabi .................... | G06Q 40/04 |
| | | | 705/37 |
| 2014/0201191 A1 | 7/2014 | Karmarkar | |
| 2015/0127516 A1 | 5/2015 | Studnitzer et al. | |
| 2017/0091756 A1 | 3/2017 | Stern | |
| 2018/0108086 A1 | 4/2018 | Jang et al. | |

OTHER PUBLICATIONS

Hardware Based Projection onto The Parity Polytope and Probability Simplex (Year: 2016).*

"Binary Space Partitioning", Wikipedia, accessed May 31, 2022, 8 pages.

"Support-vector machine", Wikipedia, accessed Jun. 2, 2022, 21 pages.

Balevic et al., "Scaling Data-Intensive Applications on Heterogenous Platforms with Accelerators", 2012 IEEE 26th International Parallel and Distributed Processing Symposium Workshops & PhD Forum, 8 pages.

Bieling et al., "An Efficient GPU Implementation of the Revised Simplex Method", 2010 IEEE International Symposium on Parallel & Distributed Processing, Workshops and Phd Forum (IPDPSW), 2010, 8 pages.

Chari etal, Efficient k-means++ with random projection, May 1, 2017, IEEE, 2017 International Joint Conference on NeuralNetworks (IJCNN) (pp. 94-1 00) (Year: 2017).

Charlton et al., "Two-Dimensional Batch Linear Programming on the GPU", Journal of Parallel and Distributed Computing, vol. 126, Apr. 2019, 23 pages.

Examination Report from European Patent Application No. 20 184 573.2, dated Apr. 4, 2022, 6 pages.

Extended European Search Report, from EP Application No. 20184573, Dec. 17, 2020, EP.

Gurung et al., "Simultaneous Solving of Batched Linear Programs on a GPU", ICPE '19, Session 3: High Performance Computing, Apr. 7-11, 2019, 8 pages.

Prusa etal. "Universality of the Local Marginal Polytope", Center for Machine Perception, Faculty of Electrical Engineering, Czech Technical University, Proceedings of the IEEEConference on Computer Vision and Pattern Recognition (CVPR), 2013, pp. 1738-1743 (Year: 2013).

Tobon etal., Adapting polytopes dimension for managing degrees of freedom in tolerancing analysis, 14th CIRP Conference onComputer Aided Tolerancing (CAT), May 2016, Gothenburg, Sweden (Year: 2016).

Wasson et al, Hardware Based Projection onto The Parity Polytope and Probability Simplex, 2015 49th Asilomar Conference on Signals, Systems and Computers; Nov. 2015 (Year: 2015).

Zulfiya Gabidullina, "Solving of a Projection Problem for Convex Polyhedra Given by a System of Linear Constraints", Constructive Nonsmooth Analysis and Related Topics (dedicated to the memory of V.F. Demyanov) (CNSA), 2017, 3 pages.

* cited by examiner

50

52

Initialize a constraint polytope.

53

Receive a point batch including a plurality of data points.

54

Analyze the data points of the point batch.

55

Perform a projection of the data points to the constraint polytope.

56

No

Determine whether a fail rate requirement is met.

Yes

57

Update adaptive mechanism.

DISTANCE FUNCTION

TIME GROWS APPROXIMATELY LINEARLY WITH POLYTOPE SIZE

TIME GROWS LINEARLY WITH BATCH SIZE

1. Process overview

2. Boundary cuts creation (1.7)

Case study iterations

BATCHED BOUNDARY CUT GENERATOR

CROSS-REFERENCE TO RELATED APPLICATION

This application claims the benefit of the filing date under 35 U.S.C. § 119(e) of U.S. Provisional Application Ser. No. 63/208,323, filed Jun. 8, 2021, the entirety of which is incorporated by reference herein and relied upon.

This application is related to U.S. patent application Ser. No. 16/578,836 filed Sep. 23, 2019, entitled "OPTIMIZED BATCHED POLYTOPE PROJECTION", which is hereby incorporated by reference in its entirety.

BACKGROUND

In the technological field of computer science, approximation algorithms calculate solutions to optimization problems in which a difference between the calculated solutions and an optimal solution can be calculated to a certain degree of certainty. Linear programming may use an approximation algorithm to maximize or minimize one or more linear variables as applied to a particular quantity such as an output using one or more linear constraints. Linear programming, which may also be referred to as linear optimization, is a method to achieve the best outcome (such as maximum profit or lowest cost) in a mathematical model whose requirements are represented by linear relationships. Linear programming is a special case of mathematical programming (also known as mathematical optimization). Linear programming may be applied to non-deterministic polynomial-time hardness ("NP") hard optimization problems in which a solution can be verified quickly but cannot be solved quickly. Using time complexity theories for the amount of time required for running the approximation algorithm, it is determined how close an optimal solution may be determined within the bounds of polynomial time.

More formally, linear programming is a technique for the optimization of a linear objective function, subject to linear equality and linear inequality constraints. This technique's feasible region, i.e., the set of feasible solutions, is defined/bounded by a convex polytope, which is a set defined as the intersection of finitely many half spaces, each of which is defined by a linear inequality. The technique's objective function, i.e., the function for which it is desired to maximize or minimize, is a real-valued affine (linear) function defined on this polyhedron. A linear programming algorithm finds a point in the polytope where this function has the smallest (or largest) value if such a point exists.

Linear optimization has applications in many fields where problems involving multiple variables must be solved. One such application is in electronic transaction processing systems, such as electronic trading systems, in which participating traders incur costs, e.g., monetary costs, such as margin or capital requirement, or computational resource costs, such as data storage capacity, depending on their activities where those costs may vary depending on how those activities interact with each other or the activities of other traders. Linear optimization may be applied to minimizing such costs by optimizing a trader's activities, etc.

Approximation algorithms may be applied to relatively simple systems efficiently. An example includes the diet problem where a set of foods are defined each having different nutritional value and a different cost, and an algorithm may select the best foods for the diet according to constraints. However, as the number of variables and the number of constraints become much higher, the time complexity of the solutions render the algorithm impractical in some applications. Instead, an approximation algorithm may not return "exact" solutions but reduce the time complexity of the solutions. Approximation algorithm techniques that render solutions quickly with a high number of variables and linear constraints, which may be handled in any time optimization, may be useful.

For example, in electronic trading, traders are often required to post margin to cover the risk of loss of their positions. Such systems may require two types of margin, initial margin and maintenance margin. Initial margin is an amount of capital required to be posted when a trader initially places a trade order while maintenance margin is an amount required to be posted periodically to cover changes in the value, e.g., relative to changes in the market value over time, of a trader's open position(s).

Typically, margin, whether initial margin or maintenance margin, is computed based on the entirety of positions being entered into and/or currently held by a trader in order to recognize offsetting trades or positions. This results in a margin value which most closely approximates the actual risk of loss which may need to be covered should the trader or exchange need to dispose of their positions and minimizes the amount of capital required from the trader.

In bilateral trading, also referred to as Over the Counter (OTC) trading, traders making trades must often consider not only their own goals and constraints but also the constraints of their potential counterparties, often derived from those counterparties own goals, when entering into trades so as to achieve their goals as closely as possible while complying with the constraints of their counterparties and minimizing costs, such as margin. Further, in a fast moving market, this process needs to occur quickly to avoid missing opportunities.

In contrast to a central counterparty based trading system, such as futures and options of futures trading systems, in which trades are novated to substitute the electronic trading system as a party to each side of the trade, obviating a need of one trading party to know of or consider the needs of their counter party, bilateral trading involves trading parties directly entering into trades with one another to transact in OTC instruments.

Similar to exchange traded instruments, such as futures contracts, which involve purchase or sale of an obligation to occur at a later date, over-the-counter (OTC) products include financial instruments, i.e., derivatives, which involve obligations to occur at a later date but which are bought, sold, traded, exchanged, and/or swapped directly between counterparties instead of via an exchange. OTC products may further include periodic obligations, such as the periodic payment of interest, during the life of the position. OTC instruments include interest rate based instruments, such as forward swaps, interest rate swaps, described in more detail below, and currency based instruments, such as foreign exchange (FX) instruments.

Many OTC instruments/derivatives exist to fill a wide range of needs for the counterparties who buy and sell them, including limiting or mitigating exposure to risks and/or maximizing cash flow.

An interest rate swap (IRS) is an example of a type of OTC product where the parties agree to exchange streams of future interest payments, e.g., floating vs fixed interest rates, based on a specified principal or notional amount. Each stream, e.g., the floating rate stream and the fixed rate stream, may be referred to as a leg. Swaps are often used to hedge certain risks, for instance, interest rate risk. They can also be used for speculative purposes. An example of a swap includes a plain fixed-to-floating, or "vanilla," interest rate swap. The vanilla swap includes an exchange of interest streams where one interest rate stream is based on a floating rate and the other interest rate stream is based on a fixed rate. In a vanilla swap, one party makes periodic interest payments to the other based on a fixed interest rate. In return for the stream of payments based on the fixed rate, that party may receive periodic interest payments based on a variable rate from the other party. The payments are calculated over the notional amount defined in the contract. The variable rate may be linked to a periodically known or agreed upon rate for the term of the swap such as the London Interbank Offered Rate (LIBOR) or Secure Overnight Funding Rate (SOFR). This rate is called variable, because it is reset at the beginning of each interest calculation period to the then current reference rate, such as the LIBOR published rate.

The parties to an IRS swap generally utilize these exchanges to limit, or manage, exposure to fluctuations in interest rates, or to obtain lower interest rates than would otherwise be unobtainable. Usually, at least one of the legs to a swap has a variable rate. The variable rate may be based on any agreed upon factors such as a reference rate, the total return of a swap, an economic statistic, etc. Other examples of swaps include total return swaps, and Equity Swaps. The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment. Currently, financial institutions, such as banks, trade interest rate payments and/or interest rate swaps over the counter. Streams of future payments must be valued to determine a current market price. The market value of a swap is the sum of the difference between the present value of the future fixed cash flows and the floating rate and the price of the swap is determined based on the fixed rate. Because the fixed rate of a particular swap is determined based on the available fixed rate at the time the price is struck, which frequently changes, the fixed rates associated with two different swaps will rarely be the same.

Often, a trader desires to enter into certain trades in order to achieve some financial result but is subject to certain constraints. That is, as long as the trades achieve the desired result within the set constraints, the trader may be unconcerned with the specific parameters of those trades. For example, in bilateral trading, a trader may seek to enter into trades with multiple counterparties to achieve a particular result, where each of those counterparties has specific restrictions or constraints on the transactions they are willing to enter into. However, in many cases, many different trade combinations may satisfy the requirements, i.e., achieve the result while meeting the counterparty restrictions/constraints, but may trigger different initial margin requirements. Accordingly, it may be desirable to achieve the goal, or come as close as possible, of the trader while minimizing the initial margin cost.

DETAILED DESCRIPTION

The disclosed embodiments relate to a computer implemented system and process which simplifies and improves the computational performance/efficiency of the application of linear optimization algorithms and methods to complex electronic multivariate data processing/analytical systems, such as electronic trading systems which implement optimization of initial margin in goal-defined bilateral trading. The disclosed embodiments may be deployed by the electronic trading system or as an adjunct service accessible thereby.

More particularly, the disclosed embodiments relate to a computer implemented system/method for enabling a trader to specify/define one or more constraints and/or goals to be achieved by a set of one or more trades with one or more bilateral counterparties wherein the disclosed system automatically computes a set of trade orders which most closely achieve the defined goal(s) within the specified constraints having the optimal initial margin requirement. In one embodiment, one of the constraints may be a limit on how much time the disclosed embodiments may take to identify an optimal the solution, the optimal solution then being the most optimal solution found within the define time limit.

Figure 1A:
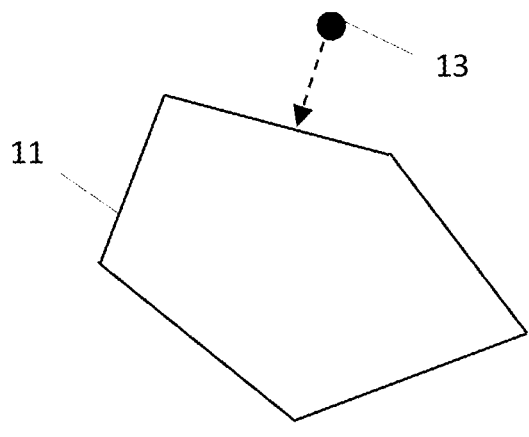
FIG. 1A depicts an example projection for quadratic programming.

Linear programming includes maximizing or minimizing a linear function based on linear constraints. A linear programming technique optimizes a function under one or more constraints defined according to one or more linear equalities and/or one or more linear inequalities. When represented geometrically or spatially, the region describing the solutions is a convex polytope. In elementary geometry, a polytope is a geometric object with flat sides (faces). It is a generalization in any number of dimensions of the three-dimensional polyhedron. Polytopes may exist in any general number of dimensions n as an n-dimensional polytope or n-polytope. In this context, "flat sides" means that the sides of a (k+1)-polytope consist of k-polytopes that may have (k−1)-polytopes in common. For example, a two-dimensional polygon is a 2-polytope and a three-dimensional polyhedron is a 3-polytope. The polytope may be the intersection of spaces limited by the one or more linear equalities and/or the one or more linear inequalities. Using two-dimensional space for ease of illustration, FIG. 1A depicts an example polytope 11 as a pentagon or five-sided polygon having five sides defined according to five inequalities. Other examples may be n-dimensional where n is any number or integer. That is, rather than polytope 11 which is 2-dimensional, a polytope may be three-dimensional, four-dimensional, or a larger dimension.

In one application, the disclosed embodiments, as will be described, are implemented as a post trade service that mitigates risk concentration which emerges when credit exposure of cleared trades can no longer be netted against bilateral trades across different asset classes that are ineligible for clearing. In on implementation, this service may be referred as "triBalance" and offered by TriOptima, an infrastructure service offered by OSTRRA, a joint venture between CME Group, Inc. and IHS Markit. triBalance reduces sources of contagion risk in both cleared and bilateral counterparty relationships by rebalancing counterparty credit risk exposure driven by future market movements. Utilizing a multilateral optimization engine, triBalance calculates an optimal counterparty risk-reducing set of rebalancing trades for all participants to execute that offsets existing risk versus central clearing counterparties (CCPs) and bilateral counterparties simultaneously. Reducing risk exposure to bilateral counterparties and CCPs will reduce initial margin requirements, regulatory capital, margin volatility, CVA hedging costs and close out risk while contributing to a decrease in systemic risk and a simplification of the CCP's default management process. triBalance cycles will be held periodically to reduce and maintain a low potential future exposure to market movements. Contagion risk—which is also referred to as systemic risk—is here defined as the risk that financial difficulties at one or more bank(s) spill over to a large number of other banks or the financial system as a whole. triBalance reduces counterparty and systemic risks across a portfolio, lowers capital and funding costs of maintaining derivatives and IM exposures, and enables more efficient use of operational resources and optimizes the cost of bilateral and cleared initial margin.

The term "polytope" may be defined to include all convex, geometric objects with flat surfaces even though they are not solid, for example if a single line divides a two-dimensional space in two, the feasible side may be referred to as a polytope. Furthermore, the following embodiments handle linear dimension reductions freely in the polytope projection functionality.

Projecting one point (e.g., point 13 in FIG. 1A) to the closest point within a polytope amounts to solving a quadratic programming problem with standard algorithms, but this method is not adaptive, applies to one point at a time and does not normally include allowed imperfection. As used herein, to "project" a point means to vary one or more parameters of the solution set represented by that point which define where, with respect to a constraint defined polytope, that point is positioned, e.g., within or outside of the feasible region defined by the polytope, so as to attempt to alter that position, e.g., to attempt to move the position from the infeasible region outside of the polytope to the feasible region within the polytope. In one example, projection may involve varying one or more parameters of a trade of a set of trades of a given solution set. Projection may be accomplished via randomized variations and/or specific variations and, as will be described, may be iteratively performed to identify specific variations, or encompassing solutions sets thereof, which render an infeasible solution feasible.

Figure 1B:
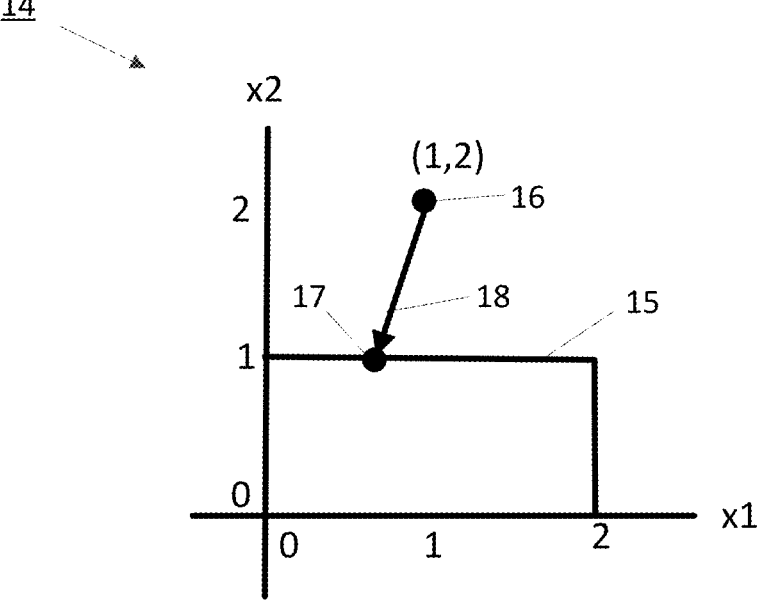
FIG. 1B depicts an example distance calculation for quadratic programming.

FIG. 1B illustrates a graph 14 of another example polytope. The graph includes a polytope 15 having two dimensions, x1 and x2. The polytope 15 is defined by the inequalities x1>0, x1<2, x2>0 and x2<1. A point 16 outside of the polytope 15 is at x1=1, x2=2. A calculation is performed to move the point according to arrow (vector) 18 so that the result, point 17, is on or within the polytope 15. To find the closest point to the starting point 16 the length of the vector 18 is minimized. The distance for minimization may be calculated for example using sqrt ((1−x1) 2+(2−x2) 2), where (x1,x2) are the coordinates of the point 17. Since optimizing a square root is the same as optimizing what is within the square root, the calculation simplifies to the optimization of $(1-x1)^2+(2-x2)^2$ subjected to x1>0, x1<2, x2>0, x2<1, which when expanded yields an expression with linear and quadratic terms in x1 and x2 subjected to linear constraints in x1 and x2, which is a quadratic programming problem. By inspection, the solution in the graph 14 of FIG. 1B is (1,1).

Figure 2:
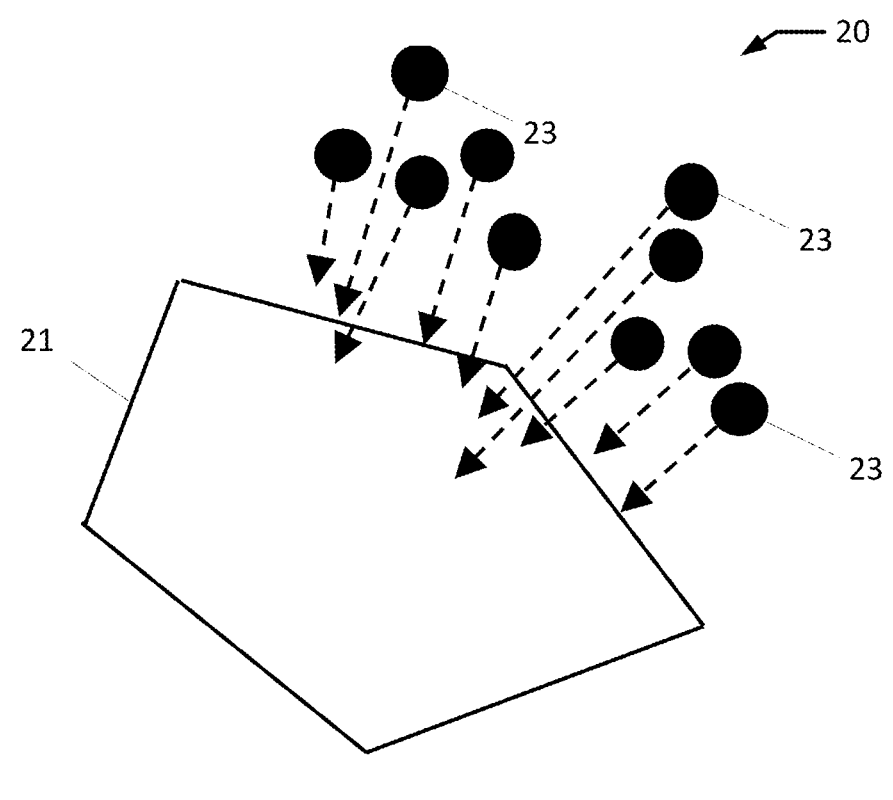
FIG. 2 depicts an example of batch projections.

FIG. 2 includes a batch projection 20 of multiple points 23 to a polytope 21. The batch projection 20 enables the projection of multiple data points to a polytope in parallel, using the same instructions (apart from time-insignificant diagnostic procedures) for all points simultaneously in an iterative manner until the fail rate of points is acceptable. If a polytope is used to constrain the solution space in evolutionary optimization, a strategy is to penalize data points outside of the polytope with the goal of steering the points towards the polytope over many iterations of the optimization. However, the embodiments disclosed herein instead project the data points to within the polytope in every optimization iteration. This solves the problem of projecting large quantities of data points to a polytope in any given dimension. The objective is not to find the mathematical optimal projection for each point, but to maximize throughput by accepting a reasonable imperfection in projection precision, in terms of optimality and feasibility, and an acceptable fail rate of points, that is a fraction of the data points will not be projected properly.

One application for batch projections is a polytope defined by trade constraints for the determination of a margin requirement, e.g., an initial margin requirement for a proposed set of trades which satisfy a particular set of constraints. A client may submit trade requirements along with trade constraints and the disclosed embodiments will calculate a set of trade orders which satisfy the trade requirements and trade constraints while minimizing the requisite amount of initial margin. Once a proposed set of one or more trade orders has been calculated/identified, they may be presented to the trader for acceptance/submission, e.g., via a trading user interface of the trade's computer system. As noted above, initial margin (IM) is the amount of collateral funds required to open a position as required by a particular entity. The entity may be an exchange or clearinghouse that clears trades and requires traders to maintain performance bonds in margin accounts to cover risks associated with the portfolios. The clearinghouse (e.g., central counterparty to financial products) may use the performance bond to counter margin risk associated with the portfolio.

Risks may utilize complex algorithms to be analyzed to determine required initial margin amounts and maintenance margin amounts.

Alternatively, the particular entity may be a governing body that sets regulations for market participants that engage in over the counter (OTC) instruments or derivatives with one another without clearing. One example governing body is described by the Standard Initial Margin Model (SIMM) that describes requirements or constraints for these uncleared contracts between market participants. Another example governing body is the International Swaps and Derivatives Association, Inc. (ISDA).

The initial margin is the total amount of margin (per contract or in aggregate) required by the entity when a position is opened. A drop in funds below this level requires a deposit back to the initial margin levels, i.e., a performance bond call. A performance bond call, also referred to as a margin call, is a demand for additional funds to bring the account back up to the initial performance bond level whenever adverse price movements cause the account to go below the maintenance.

Example contracts may include a currency forward, an interest rate swap, a credit default swap (CDS), and an interest rate swaption. The example contracts available may be limited to those contract that contribute to the initial margin requirements. For example, some margin requirements are not impacted by specific contract types.

A currency forward locks in an exchange rate for the purchase (and sale) of a currency on a future date. An interest rate swap involves the exchange of one stream of future interest payments for another based on a principal amount. Interest rate swaps may involve the exchange of a fixed interest rate for a variable rate. A CDS allows a market participant to offset his or her credit risk with that of another. To swap the risk of default, the market participant buys a CDS from another who agrees to reimburse in the case a named borrower defaults.

Example asset classes or product classes for the contracts may include currency/rates, equity, credit and commodities. Each product may include one or more types of risk such as interest rates risk, credit risk, equity risk, commodity risk and FX risk. Each risk may include one or more risk measures such as delta, gamma, vega, and curvature. Delta may be the first order derivative with respect to underlying price. Gamma may be a second derivative from a value of the underlying instrument. Vega may be the first order derivative with respect to implied volatility. Curvature may describe additional risk on moves of delta in response to price fluctuations.

Figure 3:
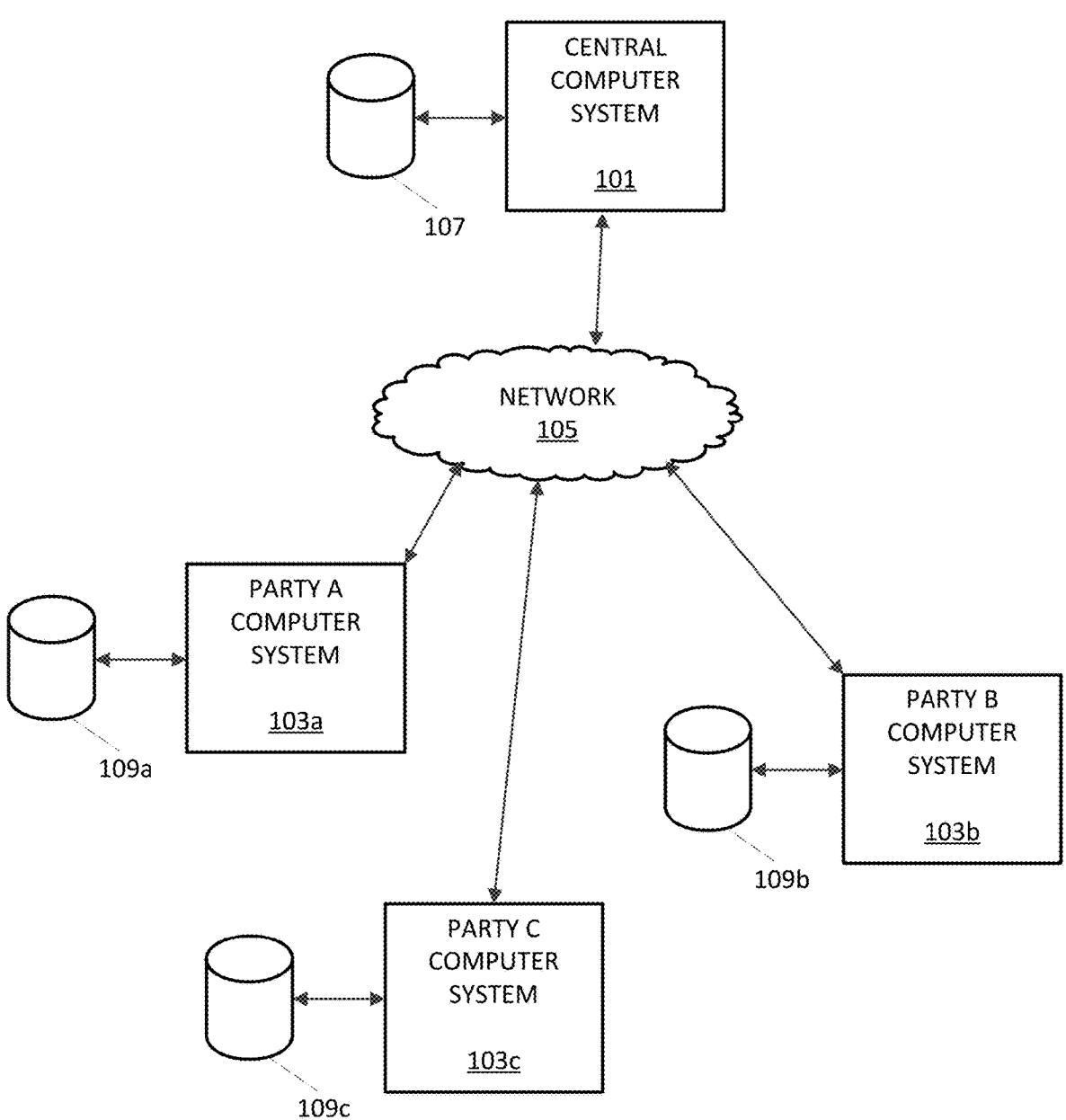
FIG. 3 depicts an illustrative computer network system for a direct system used to implement aspects of the disclosed embodiments.

FIG. 3 illustrates an illustrative computer network system for a direct system used to implement aspects of the disclosed embodiments. The computer network system includes any combination of a central computer system 101 with database 107, a party A computer system 103a with database 109a, a party B computer system 103b with database 109b, and a party C computer system 103c with database 109c. Database 109a, database 109b, database 109c, and database 107 may be referred to collectively as "database." In some examples, as discussed in more detail herein, the central computer system 101 constructs the polytope constraints, analyzes possible solutions, and calculates an optimal solution, e.g., a set of trades having the lowest initial margin amount which satisfy a given set of constrains, including a limit on the amount of time the system has to arrive at an optimal solution. In other examples, each computer system 103a-c constructs the polytope constraints, analyzes possible solutions, and calculates an optimal solution. In other embodiments, portions of the calculations may be performed at each node. For example, the central computer system 101 may select solutions and provide polytope constraints and the computer systems 103a-c analyze the solutions and calculate the optimal solution. In another example, the computer systems 103a-c define the constraint polytope and send it to the central computer system 101, which analyzes the solutions and calculates the optimal solution. In any of these examples, the device that analyzes the constraint polytope for the possible solution and calculates the optimal solution may be referred to as the polytope controller ("PC"). Other examples may be possible.

The databases 107, 109a-c may include data indicative of the constraints as well as the points for possible solutions, e.g., sets of trade orders. The solutions may be made of many variables. The solutions may describe specific transactions to be undertaken and/or resulting changes in positions of a portfolio to be obtained via transactions specified by the trader associated with the respective computer system. The variables define a location in n-space. The same n-space describes a constraint polytope. The constraint polytope may be defined by a plurality of linear constraints including one or more linear inequalities stored in the database. The inequalities may be stored as a vector or a matrix with elements in the vector or matrix defining coefficients in each of the dimensions of the constraints. Thus, the database may store a constraint having n-elements for a constraint polytope in n-space.

The computer network system may be centralized such that the batch projections and analysis are performed on central computer system 101. Alternatively, the central computer system 101 may be omitted in a distributed system and performed at each party by the respective computer system 103a-c. Any number of computer systems and/or parties may be included in the system. Additional, different, or fewer components may be included.

The disclosed embodiments optimize the initial margin, e.g., minimize the amount, associated with such trades by optimizing the trades submitted by clients that meet the constraints. For example, optimizing trades between banks lower their initial margin with each other. There may be hundreds, thousands, or effectively, an infinite number of solutions, i.e., sets of trade orders, that meet the constraints and each such potential solution defines a point, and each point may represent thousands of trades which make up a proposed solution. The polytope is used to constrain the solution space.

The disclosed embodiments may implement a function, available via a user interface of a trader's computer workstation, which a trader can invoke, along with providing constraints, to obtain a set of proposed trades which satisfies the constraints and which results in an optimal IM, e.g., the lowest IM. Of the plurality of parameters fully defining a set of one or more trade orders and/or desired result thereof, the constraints may comprise a subset of those parameters which are required (to have particular discrete values, or be within particular max/mins, etc.) where the system is free to vary any unconstrained parameters or range-constrained parameters in order to create the set of proposed trades which satisfies the constraints with the least IM (or as close to as possible withing a processing constraint, e.g., processing time limit. The Trader can then choose to accept the proposed trades or not.

Example trade constraints may include currency constraints or temporal constraints. The currency constraint may define a risk against a particular counterparty. In some examples, trades contribute to a certain bucket, and a bank may specify a constraint related to the bucket.

Constraints may be linear or non-linear depending on the how a value thereof relates to its effect on the solution set. Linear constraints are those where a change in an input value results in a sequential, proportional or continuous change in an output value. For example, where a um of values cannot exceed a threshold value. For non-linear constraints, changes in an input value result in a non-sequential, non-proportions, discontinuous and/or non-smooth output. That is the outputs do not progress or develop smoothly from one stage to the next in a logical way. Instead, the output make sudden changes, or seems to develop in different directions at the same time). Examples of non-linear constraints may result in outputs which jump, have gaps, or change in discrete increments.

Example trade constraints for parties or market participants in OTC transactions may include currency/FX delta risk for a given currency pair against a counterparty, Currency/FX delta risk for a given currency pair overall counterparties. FX vega of a currency pair, interest rate delta risk against a given interest rate curve in a given currency, interest rate vega risk in a currency, CDS delta, CDS vega, commodity delta, commodity vega.

The following embodiments describe a process which involves thousands of points (solution trade order sets) in a multi-dimensional space, and at each iteration of evolution, points are projected to a set of linear inequalities with an accepted fail rate. Each iteration of evolution may move all points a limited but significant distance before the projection, creating the setup of batches. The following embodiments project data in batches and leverages the fact that there is some degree of similarity between points in a batch. Furthermore, it assumes that there is some degree of similarity between points in successive batches, although the characteristics of batches can evolve over time. The following embodiments analyze batches over time to adapt and improve efficiency of successive batches.

As described in more detail below, specialized hardware is utilized to process and analyze the point batches. The hardware may include a graphics processing unit (GPU) including an architecture specialized to achieve high scalability for analyzing the point batches described herein. The disclosed system projects multiple data points to a polytope in parallel using the architecture of the GPU. The GPU may utilize the same instructions for all points simultaneously in an iterative manner until the fail rate of points is acceptable. In other examples, another hardware device or CPU configured for parallel processing may be used such as a field programmable gate array. The hardware device may include at least a threshold number of cores (e.g., 60).

The disclosed system solves the problem of projecting large quantities of data points to a polytope in any given dimension, leveraging GPU architecture to achieve high scalability. The objective is not to find the mathematical optimal projection for each point, but to maximize throughput by accepting a reasonable imperfection in projection precision, in terms of optimality and feasibility, and an acceptable fail rate of points (i.e., a fraction of the data points will not be projected properly).

The disclosed technology addresses the need in the art for improving the efficiency of linear optimization systems, particularly used for constrained multivariate value minimization, such as identifying a set of trade orders which meet a set of predefined constraints and having an optimal initial margin amount. Specifically, the disclosed technology solves a problem that uniquely arises in the fields of computer technology and exchange computing systems, where it is useful to assist traders in performing complex computations which cannot otherwise be reasonable performed manually. The disclosed embodiments not only improve the efficiency with which such sets of constraint-compliant trade orders may be identified, but also improve the quality, e.g., minimization of requisite initial margin therefore. Beyond exchange computer systems, the disclosed technology generally improves computer implemented linear optimizers by increasing likelihood of finding an optimal solution without trial and error and risk of over-compensating, improves the efficiency thereof, and enables intermediate solutions and processing of confidential data. Thus, the disclosed solution is rooted in computer technology in order to overcome a problem specifically arising in the computer systems used by electronic trading and other systems which utilize linear optimization. Indeed, the subject technology further improves the functioning of the computer by allowing it to use fewer resources.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

Figure 4:
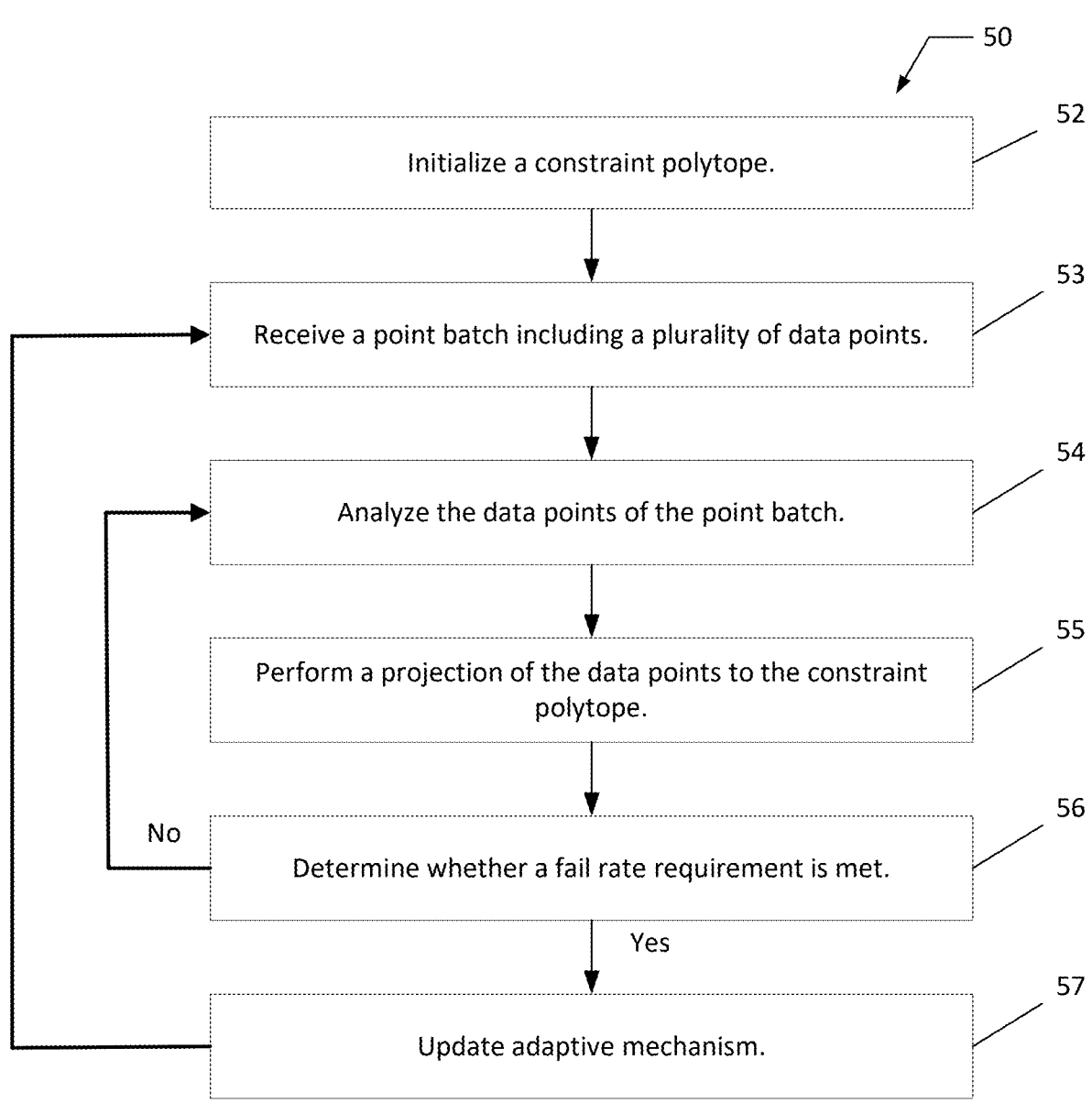
FIG. 4 depicts an example flowchart of the operation of the disclosed embodiments.

FIG. 4 depicts a flow chart showing operation of central computer system 101 and/or the party computer system 103 of the computer system network of FIG. 3 and additional systems described herein (e.g., FIG. 10), which may be referred to as an adaptive polytope projector. In particular FIG. 4 shows a computer implemented method 50 for performing a batch projection that dynamically adapts and selects one or more transactions to meet one or more constraints. The following embodiments may be initialized with any combination of space dimension, a polytope description, an accepted fail rate and a feasibility tolerance. A polytope can be described in many ways, but the embodiments expect linear inequalities or variable bounds. Any dimension reductions should be described as linear equalities. Additional, different, or fewer components may be included.

At act 52, the adaptive polytope projector initializes a constraint polytope. The initialization may include multiple stages such as a polytope parameter stage, an adaptive mechanism stage, and a user parameter stage. These stages may be performed at different times or the same time. The stages may be performed before any of the projection batches are performed or received. The stages may be performed in response to receipt of the first batch. The parameters defined in these stages may be reused for multiple batches. The parameters may be stored (e.g., in databases 107, 109) in association with the constraint polytope or an identifier for the constraint polytope.

The polytope parameter stage may define parameters of the constraint polytope. One example parameter is a constraint matrix A for the constraint polytope. An orthogonal matrix N spans the null space of A. A transformation matrix T sorts the variables or columns of A in a specific order needed by the algorithm, and adds entries for needed slack variables. An orthogonal projector P is $N^T N$ or N transposed multiplied with N. The partial matrix or submatrix $N^b$ denotes a portion of N defined by the last b rows of N. $P^b$ denotes $N^b N^{b^T}$.

The adaptive mechanism stage for initialization may define or initialize one or more vectors or matrices for the adaptive mechanism. A solution matrix is defined as $x^p$.

Variable bound vectors lb and ub are selected based on variable bounds. For example, if there are variable bounds (for example a trade cannot move more than a number (x) of millions) there is one entry of x millions. If there is a risk constraint, such as FX delta cannot move more than 100,000 against a counterparty, then there will be an entry of 100,000 for that as well.

Vector d is selected based on an approximation of another function. Vector a is a vector that is initialized in the adaptive mechanism stage and later updated. The vector a may be any number of dimensions. The number of dimensions is selected according to the number of inequalities of the polytope. The vector a is initialized to have a value of 1 or so that each component of the vector a has a value of 1. Other initialization techniques are possible.

The user parameter stage may define one or more user selections or user customizations. In one example, the user may select an iteration limit for the iterative loop described below between acts 56 and 54. The iteration limit may be an integer value (e.g., 3, 5, 10, 20 or another number of iterations). The user may select a setting or a numerical value for an accepted fail rate and/or a feasibility tolerance.

The fail rate may be defined as a fraction or percentage of the data points that are projected to inside the area of the constraint polytope. The fail rate could be, for example, 15% meaning that if 15 or less out of 100 data points are not projected to within the polytope the projection of the batch is still deemed successful.

The feasibility tolerance provides a limit on quantity of projected data points that can exceed an individual inequality. The feasibility tolerance may be defined by a vector having elements corresponding to each of the inequalities defining the constraint polytope. Alternatively, the feasibility tolerance may be a single number applied to all of the inequalities. The feasibility tolerance could be, for example, 10 meaning that an inequality can be breached with at the most 10 but still be deemed fulfilled.

In another example, the fail rate and/or feasibility tolerance may be variable. The fail rate may be changed according to an external factor. The external factor may be day of the week or day of the year. The external factor may be a prevailing interest rate. The external factor may be a market index. As the external factor changes the fail rate and/or feasibility tolerance is adjusted in response to changes in the external factor. In some examples, when the external factor increases, the fail rate and/or feasibility tolerance is increased. In other examples, when the external factor decreases, the fail rate and/or feasibility tolerance is decreased.

In another example, a distance tolerance provides a limit on a distance between the projected data points and an individual inequality. The distance tolerance may be defined by a vector having elements corresponding to each of the inequalities defining the constraint polytope.

Thus, the polytope controller, which as noted above is a device that analyzes the constraint polytope for the possible solution and calculates the optimal solution, is configured to initialize any number (or all) of the values for T, $x^p$, lb, ub, N, P, $N^b$, $P^b$, d and a used in the techniques described herein. The initialization may be before the projection of batches starts and the values may be reused. The value(s) for a may be first initialized at default value(s) and subsequently updated as the process repeats (performs multiple iterations) for a series of batches.

The linear constraints of an optimization model for the constraint polytope can be expressed in a constraint matrix C where some rows in the matrix are equality constraints and some are inequality constraints. The right-hand-side of C is equal to $b^c$, where again some rows of C are equalities to be and some are inequalities to the same. Let s be a solution to the model and subjected to variable bounds $lb^s$ and $ub^s$ so that $$lb_i^s \le s_i \le ub_i^s.$$

The linear parts of the model can thus be expressed as $$C^{eq} s = b^{ceq} \qquad (1)$$

$$C^{in} s \le b^{cin}$$

$$lb_i^s \le s_i \le ub_i^s$$

where $C^{eq}$ and $b^{ceq}$ correspond to the equality rows of C, and $C^{in}$ and $b^{cin}$ been to the inequality rows. Rearrange s and the corresponding columns of C so that the indices with bounds other than infinity are at the end. Also, for each inequality constraint, add a slack variable at the end of the solution vector and convert the constraint to a zero-equality constraint, and add variable bounds for the slack variable reflecting the previous inequality limit. Let A be the new constraint matrix with rearranged columns and added slack columns, $x^a$ the new solution vector, $b^a$ the new right-hand-side and $lb^a$ and $ub^a$ the new variable bound vectors. The transformation matrix T can be used to compute s as $$s = Tx^a \tag{2}$$

At act 53, the polytope controller or adaptive polytope projector receives a point batch including a plurality of data points. The point batch includes possible solutions, each of which is a set of trade orders as described elsewhere herein, to the optimization problem defined by the constraint polytope. There may be thousands of possible solutions, where each point is a solution each solution may have thousands of variables. In one embodiment, one variable in one solution is one trade order having a particular set of order parameters. The dimension of the solution space is up to thousands of dimensions, e.g., constraints. Each point is a coordinate in the solution space. Each dimension in the solution space is a trade constraint. In one example, each solution is a vector of variables where each variable is a trade. Each solution is subjected to constraints. The inequality constraints are defined by the polytope but there may also be equality constraints.

At act 54, the polytope controller or adaptive polytope projector analyzes the data points of the point batch. The analysis may involve many possible solutions (e.g., thousands of sets of trades). Building on equation (2) above, the model can now be expressed as $$Ax^a = b^a \tag{3}$$

$$lb_i^a \le x_i^a \le ub_i^a \tag{4}$$

The non-zero values of $b^a$ correspond to the original non-zero equality constraints. Solving to get a particular solution $x^p$ of equation (3), $x^a$ can now be written as $$x^a = x + x^p \tag{5}$$

If the variable bounds are updated with $-x^p$ to create the new variable bound vectors lb and ub, the model can now be written as $$Ax = 0 \tag{6}$$

$$lb_i \le x_i \le ub_i \tag{7}$$

A feasible solution to equation (6)-(7) is provided through equations (5) and (2) be a feasible solution to equation (1), i.e. it will reside within the polytope. A has m rows and n columns. The last b values of x are bounded, and this part of the solution is denoted $x^b$.

Let N be an orthogonal matrix spanning the null space of A, giving N the dimensions n rows and (n–m) columns. It should be noted that adding linear inequalities to the model will not increase the number of columns of N since doing so both adds a row and a column of A. Let z be any vector of $\mathbb{R}^{n-m}$, then any x created as $$x = Nz \tag{8}$$

will be a solution to (6) by definition. Let P denote the orthogonal projector $N^T N$, and then any x created as $$x = Px' \tag{9}$$

will be the closest projection to a solution of equation (6) of any vector x'. Let $N^b$ denote the last b rows of N, i.e. $N^b$ will be the rows of N which will determine the bounded variables given a vector on the form of z as $$x^b = N^b z \tag{10}$$

$$N^{b^T}$$

is a matrix which transforms v of $\mathbb{R}^b$ to a vector on the form of z through $$z = N^{b^T} v \tag{11}$$

Let $P^b$ denote $$N^b N^{b^T}$$

and define $f: \mathbb{R}^b \to \mathbb{R}^b$ as $$f(v) = P^b v \tag{12}$$

f(v) gives the impact f(v) to add to $x^b$ given some input v through equation (11) and (10).

Define the function $g: \mathbb{R}^b \to \mathbb{R}^b$ as $$g(x) = \begin{cases} x_i^b - lb_i^b & \text{if } x_i^b < lb_i^b - \varepsilon, \\ 0 & \text{if } lb_i^b - \varepsilon \le x_i^b \le ub_i^b + \varepsilon, \\ x_i^b - ub_i^b & \text{if } ub_i^b + \varepsilon < x_i^b. \end{cases} \tag{13}$$

where $\varepsilon$ is the feasibility tolerance and $$x_i^b$$

is a value of a bounded variable in a solution. g(x) will give the bounded breach vector given an $x^b$. Let d be a vector of $\mathbb{R}^b$ constructed as $$d_i = \frac{1}{P_{ii}^b} \tag{14}$$

and a be a vector of $\mathbb{R}^b$ constructed as $$a = 1 \tag{15}$$

Figure 5:
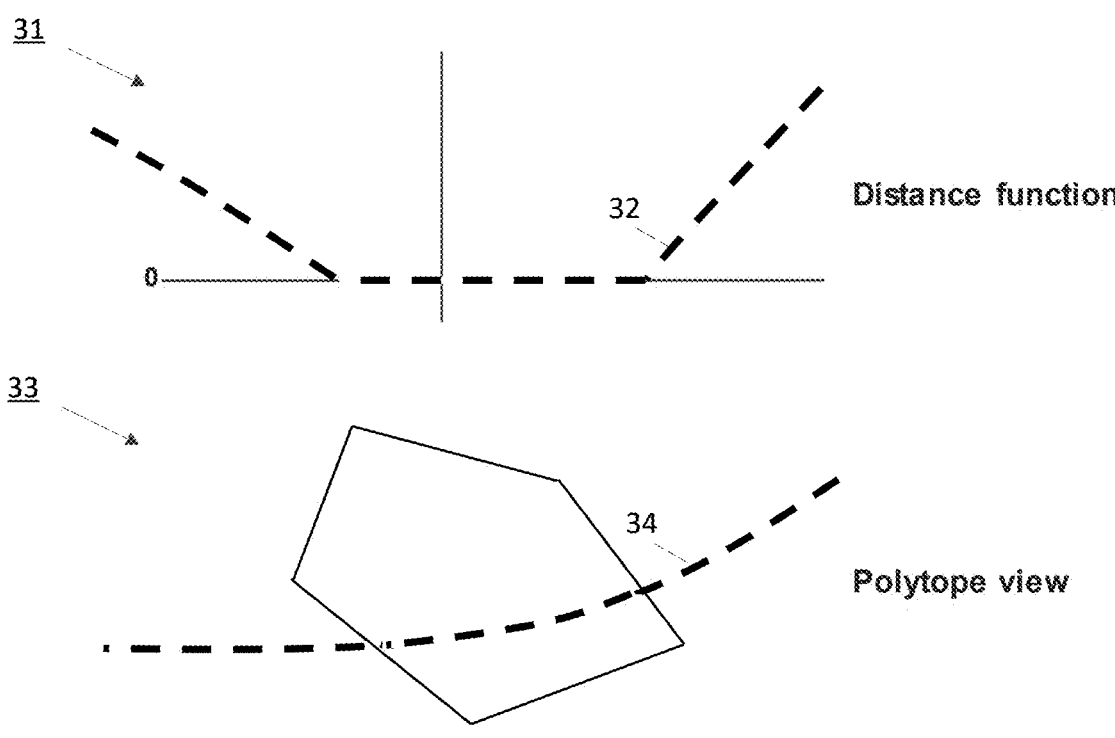
FIG. 5 depicts an example distance function for the projection.

At act 55, the polytope controller or adaptive polytope projector performs a projection of the data points to the constraint polytope. FIG. 5 illustrates a distance function 31 for a constraint polytope 33. For points along line 34, which starts spaced from the constraint polytope, intersects the constraint polytope, and ends spaced from the constraint polytope. Line 32 reflects this distance. Line 32 has a negative slope as line 34 approaches the constraint polytope, is at zero when line 34 intersects the constraint polytope, and has a positive slope as line 34 moves farther from the constraint polytope.

Assume that $p^s$ is an infeasible solution to equation (1), i.e. it is outside of the polytope, and $p^s$ is transformed to p using equations (2) and (5). If p is infeasible to equation (6) it is projected to the closest feasible solution to equation (6) using equation (9). In the case of evolutionary optimization, the point would be given as z and would then be transformed to p using equation (8), where p is a feasible solution to equation (6) by definition but infeasible to equations (6)-(7) since it is outside of the polytope. $p^b$ is the last b value of p which corresponds to the bounded variables of a solution, and thus $g(p^b)$ is the initial breach vector.

If the function $h:\mathbb{R}^b \rightarrow \mathbb{R}^b$ defined as $$h(v) = g(p^b + f(v)) \tag{16}$$

is 0 a feasible solution to (6)-(7) has been found. The feasible solution vector x is found through (11) and (8) as $$x = p + NN^{b^T}v \tag{17}$$

and the feasible solution s to (1) is then found through (5) and (2).

To find h(v)=0, v is updated as $$a_i = \begin{cases} \max(a_i - 0.01, 0.1) \text{ if the } ith \text{ variable was projected in 1 iteration for all solutions} \\ \text{or if more than 30\% of the projections of the } ith \text{ variable gave sign flip of } h_i(v), \\ \qquad\qquad \min(a_i + 0.01, 1.5) \text{ else.} \end{cases} \tag{20}$$

$$v^{j+1} = v^j - h(v^j) * d * a \tag{18}$$

$$v^0 = 0 \tag{19}$$

which has been proved efficient to make v converge and thus project the point.

In the iterations of (18) the significant computational effort is f(v) which amounts to a matrix-vector multiplication of the dimensions (b,b)×(b,1). For a batch of size r, f(v) is transformed to a matrix-matrix multiplication of the dimensions (b,b)×(b,r) where all points are projected simultaneously. Matrix-vector and matrix-matrix multiplications are very suitable to parallelize on the GPU. For each batch, the iterations of (18) are continued until the number of non-projected points are within the accepted fail rate or until the iteration limit is reached.

It is noteworthy that the main computational effort is dependent on the number of points in the batch and the number of bounded variables, inequalities of equations (6)-(7), but it is not dependent on the number of dimensions of the model.

The analyzation and projection steps (acts 54 and 55) process all data points in parallel. Other optimization methods involve solving a quadratic programming problem with standard algorithms, but such methods are not adaptive, apply to one point at a time, and do not allow imperfections. Typical evolutionary optimization uses penalty functions to steer the points towards the polytope over many iterations of the optimization by penalizing data points outside of the polytope, which not an alternative to the innovation since it keeps points infeasible and may not work or find feasible solutions.

Each element in the vector for g(x) is a distance to the inequality for that dimension of the constraint polytope. If there are 10 inequalities, equation (13) provides a vector with 10 elements for the distances between the potential solution and the constraint polytope. When one of the elements in the vector provided by equation (13) is zero, that element may be updated further. However, that variable may become infeasible again with Equation (16) since variables are connected typically and are impacted by each other. If one of the 10 variables changes, other variables may be updated. When a solution is reached within the polytope (all variables are within their bounds) the elements are not updated. In this example, when one of the elements in the vector provide by equation (13) is zero, the element may not be updated further.

At act 56, the polytope controller or adaptive polytope projector determines whether a fail rate requirement is met. For each batch, the iterations of (18) are continued until the number of non-projected points are within the accepted fail rate or until the iteration limit is reached.

At act 57, the polytope controller or adaptive polytope projector updates the adaptive mechanism. The adaptive mechanism updates the vector for the next iteration and projection of the next point batch.

After a batch has been projected, a is updated as

This makes the projection adapt to the model over time to achieve projections in less iterations. So each time vector a is slightly different, using information from the previous batch. Vector a continues to evolve through the process. If you receive multiple batches spawned from the same distribution, vector a will eventually stabilize. Even if the batch distribution changes, vector a continues to evolve along with the change in the distribution of the batch.

Through the adaptive modification of vector a, the optimal solution, or the solution having the most constraints or inequality satisfied is calculated. Through the multiple iterations of the adaptive modification of vector a, an optimal template (e.g., set of values for vector a) for the first point batch is calculated by the polytope controller or adaptive polytope projector.

The number of space dimensions and the number of equalities have no impact on the time complexity after the initialization, but the process time is linearly proportionate to the number of polytope sides as shown above. Accordingly, the disclosed system is suitable for repeated projection of points and batches to the same polytope where the work of initialization is performed only once. In contrast, quadratic programming has at best polynomial time complexity for every new point to be projected. If the same polytope is to be used in several processes over time, the initialization can be performed once and then serialized to a hard drive to eliminate the initialization phase in later projections. The disclosed system can be separated into initialization and projection phases, making it suitable for recurrent projection to a polytope (new functionality, improves speed/reduces computations/reduces hardware).

The disclosed embodiments provide an improvement to the efficiency and computer resource requirements compared to existing technologies. Example existing technologies may include systems for solving linear equations. Examples may include singular value decomposition, lower-upper (LU) decomposition, Cholesky decomposition, or other techniques. All these techniques have in common that the time complexity is in the area of $O(n^3)$ where n is the number of variables.

It can be shown for the disclosed embodiments that the time complexity for the initialization phase is proportionate to $O(mn^2)$ or proportionate and less than $O(n^3)$ depending on approach, but in practice the time of this phase can be reduced significantly if sparse representations of inequalities and equalities are used. Thus, a time complexity for the initialization phase of the disclosed embodiments is equal or less than a time complexity for a quadratic optimization solution for the constraint polytope.

The inner workings of the analyzation and projection attempt phases can loosely be described as a numerical approach to finding a minimum to the distance function of each data point individually, by processing all data points in parallel.

The significant computational work in the last stage is matrix-vector multiplications for a point, where the sizes of the vector and matrix are proportionate to the number of inequalities, and matrix-matrix multiplications for a batch, where the matrix is the same as for a point and the vector grows to a matrix with the size proportionate to the number of points in the batch. The computational complexity of matrix-vector multiplication is $O(n^2)$ and of matrix-matrix multiplication is $O(n^3)$. Again, this should be compared to the time complexity in the area of $O(n^3)$ for quadratic optimization of one point, where this stage achieves $O(n^3)$ for the full batch. Since computations are offloaded to a GPU the practical time complexity for matrix-matrix is very close to $O(n)$. Thus, for the projection attempts, of any number of variables using parallel processing, the time complexity approximates $O(n)$.

Figure 6:
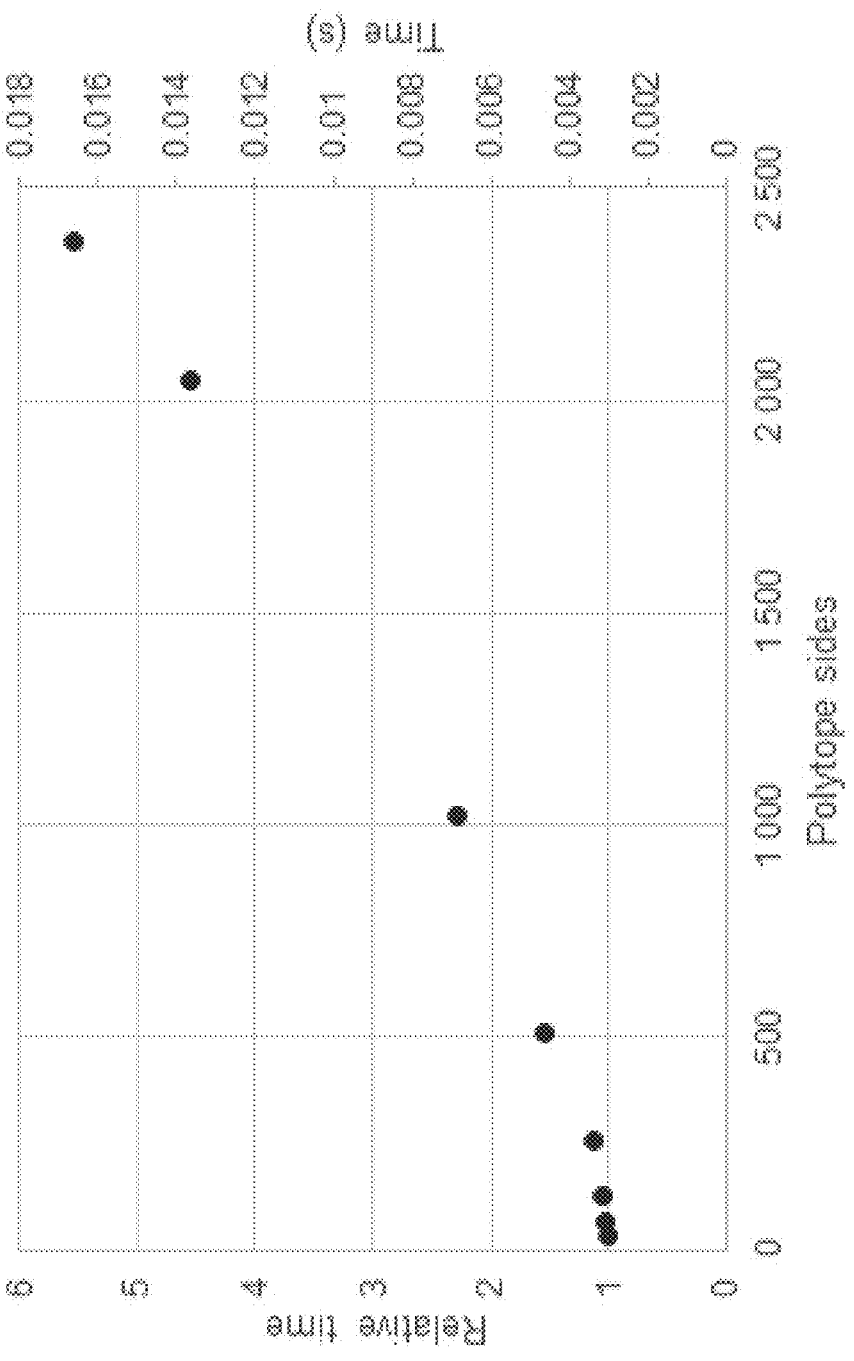
FIG. 6 depicts a chart for the time complexity with increased complexity for the disclosed embodiments.

For example, FIG. 6 illustrates that time grows close to linearly with polytope size, where 1,024 points are projected multiple times to polytopes with increased number of sides, without adaptation. In this graph the number of polytope sides or inequalities is varied, but in general performance graphs are created from a setup with a batch size of 1,024, a 4,421-dimensional space, 570 equalities and a polytope with 2,378 sides. The fail rate is 15% and a reasonable low feasibility tolerance is chosen. Similar behavior can in general be expected from most setups.

One important aspect to notice is that the number of space dimensions and the number of equalities have no impact on the time complexity after the initialization, but the process time of a batch projection is approximately linearly proportionate to the number of polytope sides due to possible parallelism as shown above. This makes the embodiments suitable for repeated projection of points and batches to the same polytope where the work of initialization is performed once, again in $O(mn^2)$ or $O(n^3)$. This can be compared to quadratic programming which has at the best polynomial time complexity for every new point to be projected. One other important aspect is that if the same polytope is to be used in several processes over time, the initialization can be performed once and then serialized to a hard drive or memory to eliminate the initialization phase in later projections.

Figure 7:
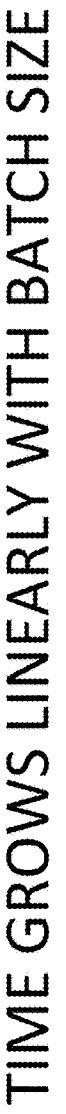
FIG. 7 depicts a chart for the time complexity with increased size for the disclosed embodiments.

FIG. 7 illustrates that the process time grows linearly with the batch size. Batches of increased size are projected to the same polytope without adaptation. At the largest size 65,500 points are projected in just above one second. When a batch has been successfully projected to the polytope the described embodiments analyze the behavior of the process and make small, speculative adaptations to internal parameters.

Figure 8:
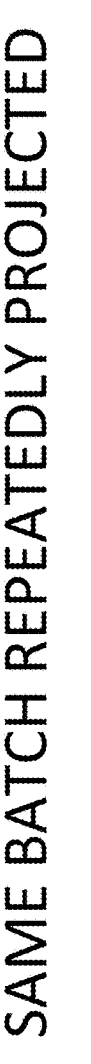
FIG. 8 depicts a chart for repeating the disclosed embodiments on the same batch of data.
Figure 9:
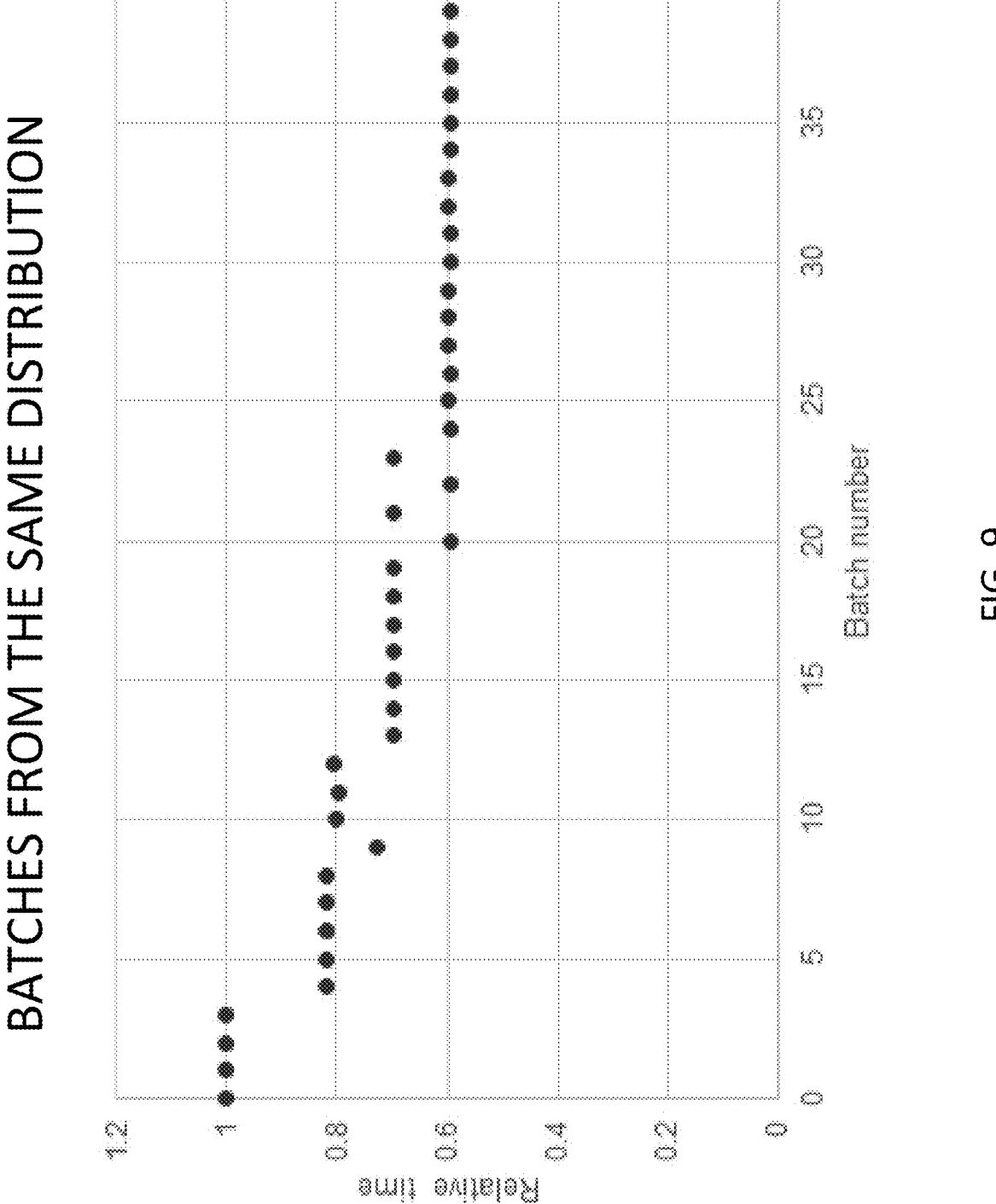
FIG. 9 depicts a chart for repeating the disclosed embodiments on the same data distribution.

FIG. 8 illustrates that, with the same batch repeatedly projected, after consecutive batch projections the adaptations will stabilize and an optimal setup for the characteristics of the data batches has been achieved. FIG. 9 illustrates that different batches but from the same distribution is repeatedly projected to a polytope with adaptation and an improvement of process time of about 40% is achieved.

If the characteristics or distribution of batches evolve over time the embodiments will continue to speculatively adapt. With small changes to the distribution the process time improvement is expected to continue to be high and the embodiments will adapt smoothly, but with larger changes it would be expected that the process time improvement decreases before the adaptation has stabilized to the new characteristics of batches.

The disclosed system projects/moves the data points to within the polytope in every optimization iteration. For example, a process is evolving thousands of points in a multi-dimensional space, and at each iteration of evolution, points are projected to a set of linear inequalities with an accepted fail rate. Each point may represent around 4,000 dimensions (the number of different trades in that point). Each iteration of evolution will move all points a limited but significant distance before the projection.

The above disclosed embodiments are split between initialization and projection, making it suitable for recurrent projection to a polytope (new functionality, improves speed/reduces computations/reduces hardware). The embodiments adapt to batch distributions and achieve significant process time improvement over time (improves speed/reduces computations/reduces hardware). Time complexity is constantly proportionate to the number of space dimensions after initialization (improves speed/reduces computations/reduces hardware). Time complexity is constantly proportionate to the number of equalities after initialization (improves speed/reduces computations/reduces hardware). Time complexity is approximately linearly proportionate to the number of polytope sides/inequalities after initialization due to possible parallelism (improves speed/reduces computations/reduces hardware).

The below disclosed embodiments improve upon the previously disclosed embodiments and their handling of convex, non-linear constraints when derivative-free optimization algorithms are used and/or when the non-linear constraints are unknown or non-differentiable. An example of this would be to optimize scenario-based Initial Margin ("IM") when scenario-based IM is also constrained in the model. Here, a user will know if a point is infeasible or not, but they would not have the boundary as a function.

When evolutionary optimization methods, i.e., optimization methods which may start with randomized variations and iteratively vary solution direction and rate in the process of boundary discovery, are used, batches of points are generated continuously, and while linear constraints are handled with Optimized Batched Polytope Projection described above, non-linear constraints cannot be handled with a similar method due their discontinuous, non-smooth, etc. nature, which results in a process where a high ratio of points will reside in the infeasible part of the solution space.

The disclosed embodiments will sample significant parts of the boundary of the non-linear feasible space during batch processing to learn about the boundary and will then use that information to bring down the ratio of points residing in the infeasible space for subsequent batches. These embodiments make use of Optimized Batched Polytope Projection embodiments, described above, and could thus be viewed as an extension to those embodiments, described in more detail in U.S. patent application Ser. No. 16/578,836 filed Sep. 23, 2019, entitled "OPTIMIZED BATCHED POLYTOPE PROJECTION", which is hereby incorporated by reference in its entirety.

As noted elsewhere, in mathematical optimization, a feasible region, feasible set, search space, or solution space is the set of all possible points (sets of values of the choice variables) of an optimization problem that satisfy the problem's constraints, potentially including inequalities, equalities, and integer constraints. This is the initial set of candidate solutions, e.g., candidate sets of trade orders, to the problem, before the set of candidates has been narrowed down.

In optimization, a candidate solution is a member of the set of possible solutions in the feasible region of a given problem. A candidate solution does not have to be a likely or reasonable solution to the problem—it is simply in the set that satisfies all constraints; that is, it is in the set of feasible solutions. Algorithms for solving various types of optimization problems, such as those described herein, often narrow the set of candidate solutions down to a subset of the feasible solutions, whose points remain as candidate solutions while the other feasible solutions are henceforth excluded as candidates.

The space of all candidate solutions, before any feasible points have been excluded, is called the feasible region, feasible set, search space, or solution space. This is the set of all possible solutions that satisfy the problem's constraints. Constraint satisfaction is the process of finding a point in the feasible set.

As with Optimized Batched Polytope Projection described above, the below disclosed embodiments can be viewed as a general processor of batches of points, where some points in each batch are discarded when outside of a boundary. As more and more batches are processed, the disclosed embodiments learn about the boundary and makes the discard rate, i.e., the computation/identification of infea sible solutions, decrease over time. To use this with evolutionary optimization algorithms is then one application of the disclosed embodiments.

As with Optimized Batched Polytope Projection, the information gathered about the boundary can be preprocessed once to an upfront cost and then the batched projection to the feasible space is cheap in term of computational cost. The information about the boundary is seamlessly incorporated into the process of Optimized Batched Polytope Projection without the need to recalculate the internal states of the linear constraints already held in Optimized Batched Polytope Projection. If the same set of non-linear and linear constraints will be used in later processes of new batches, the preprocessed information can be saved to disk, removing the need to spend the upfront computational cost again. This is already a property of Optimized Batched Polytope Projection which the disclosed embodiments inherit.

Prior solutions used penalty functions to worsen the objective value of infeasible points. These prior solutions would sample the whole solution space to then approximate the non-linear constraints with differentiable constraints.

A key aspect of the disclosed embodiments is to generate hyperplanes or cuts which place the convex, feasible region on one side and a part of the infeasible region on the other. In geometry, a hyperplane is a subspace whose dimension is one less than that of its ambient space. For example, if a space is 3-dimensional then its hyperplanes are the 2-dimensional planes, while if the space is 2-dimensional, its hyperplanes are the 1-dimensional lines. This notion can be used in any general space in which the concept of the dimension of a subspace is defined. More particularly, each hyperplane reduces a dimension/variable to consider by creating an additional linear constraint to reduce the feasible region and restrict the search for a solution by excluding/carving out regions created by a non-linear constraint that do not affect the solution. That is, hyperplanes may be iteratively added to create linear substitutes for each non-linear constraint to facilitate the base linear optimization process described herein.

If a point then does not lie on the same side as the feasible region, it should be projected to the other side to improve its feasibility. Consequently, these cuts will result in linear equalities which should be satisfied in the following batch processes. The use of hyperplanes allows the non-linear constraints to be handled with the Optimized Batched Polytope projection.

Figure 12:
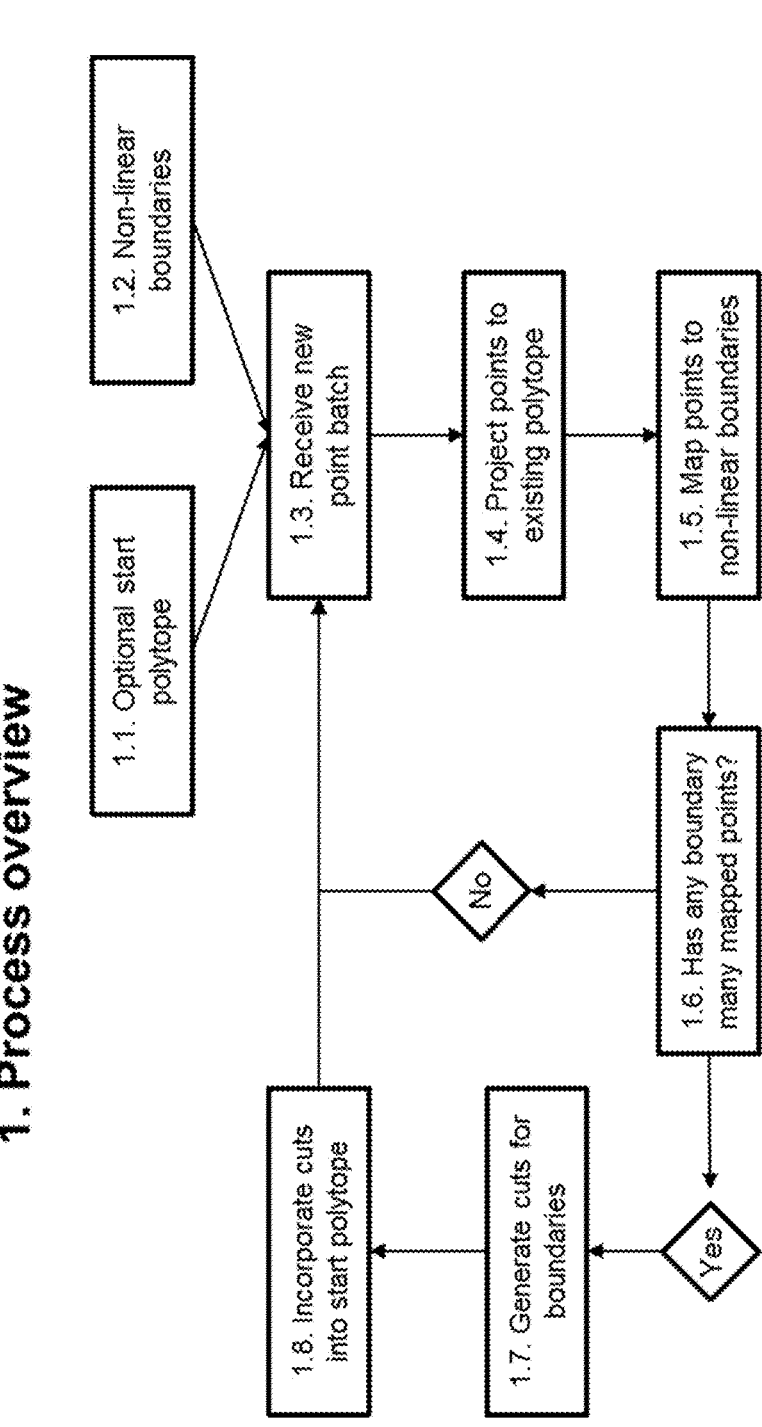
FIG. 12 depicts a flow chart showing the operation of at least one of the disclosed embodiments.

Referring to FIG. 12, as briefly described above, there are three primary steps in the operation of the disclosed embodiments. They consist of sampling during batch processing, using said sample to generate a linear approximation of the non-linear constraint and finally combination of the approximation with already existing linear constraints. As can be seen in FIG. 12, "1. Process overview", the input to the process is an optional start polytope in 1.1, which is handled with Optimized Batched Polytope Projection (described above) if provided, and a set of non-linear constraints in 1.2, to be handled with the disclosed embodiments. In 1.3, batches of points to be processed will be received continuously, where 1.3 and 1.4 corresponds to Optimized Batched Polytope Projection.

1.5, 1.7 and 1.8 correspond to the three primary steps referred to above. 1.5 does not involve any major processes but serves as the backbone of the disclosed embodiment. By sampling during batch processing, it is possible to learn about the boundary without impeding the batch processing itself. Most of the computational effort lies in 1.7. The third major step, 1.8, integrates the derived structures of disclosed embodiments into Optimized Batched Polytope Projection, altering the current polytope. Only 1.8 requires the batch processing to halt, whereas the first two can run parallel to the batch processing. The three major steps are detailed below.

Figure 14:
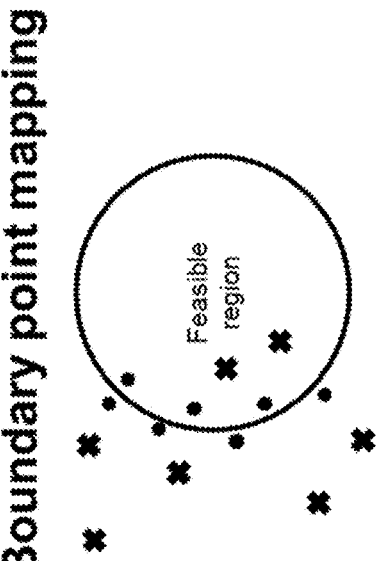
FIG. 14 a boundary point mapping showing results of the operation of the disclosed embodiments.

Referring to FIG. 14, it is generally not possible to store all points evaluated during batch processing and mapping in 1.5. However, this is not necessary. Primarily, points that lie close to the boundary will provide the information needed, which is shown in FIG. 14 "Boundary point mapping" where the dots are close while the crosses are too far away from the boundary defined by the circle. For each boundary, each point will provide a measure of how close it is to that boundary, where a negative number means that it is on the wrong side, the infeasible side, and a positive number means that it is on the feasible side. If the absolute value of this measure is smaller than boundary distance limit it will be mapped as a point close to that boundary. One point in a batch can be mapped to several boundaries. All mapped points are stored over consecutive batches to be processed later. After each point batch has been processed, each boundary is checked if it has more infeasible points mapped to it than cutting start limit in 1.6. If no boundary has reached the number of mapped points needed to add cuts, the next batch is received and processed.

Figure 13:
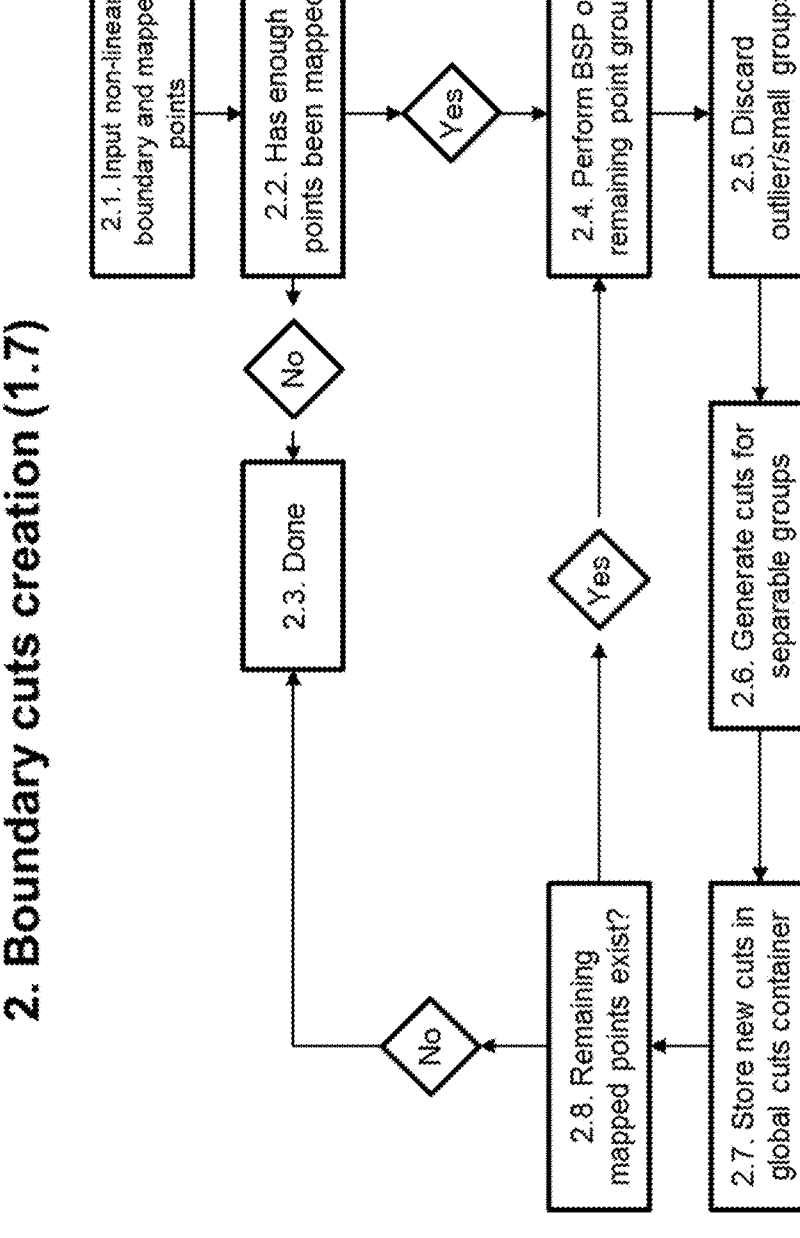
FIG. 13 depicts a flow chart showing more details of the operations of FIG. 12.

Referring to FIG. 13, "2. Boundary cuts creation" outlines how 1.7 is performed, where the input in 2.1 is one non-linear constraint and the mapped points, and 2.2 again corresponds to the check in 1.6 above. As shown in 2.4, the first major concept is Binary Space Partitioning (BSP), which is a method for recursively subdividing a space into two convex sets, i.e., a method to partition a set of points into two subsets, by using hyperplanes as partitions wherein this process of subdividing gives rise to a representation of objects within the space in the form of a tree data structure known as a BSP tree. See https://en.wikipedia.org/wiki/Binary_space_partitioning incorporated by reference herein. Performing a BSP cut to a set of points will return two sets of points separated by a cut, as can be seen to the right in the image "BSP and SVM cuts" of FIG. 15. If a BSP cut results in most of the infeasible points belonging to one of the two sets, the smaller set will be discarded based on the BSP discard limit. By doing so it is possible to remove outliers which otherwise could cause disturbances. The need for partitioning stems from the fact that a linear classifier is fitted to a problem with a non-linear boundary. Partitioning allows smaller segments of the boundary to be treated separately, increasing the likelihood that linear cuts or inequalities can approximate the boundary. To the left in FIG. 15 "BSP and SVM cuts", the mapped points to the boundary can't be separated efficiently into feasible and infeasible regions with linear cuts, but after one BSP cut has been added to the right in the image, it is possible to separate feasible and infeasible points into groups on either side of the BSP cut as shown by the Support Vector Machine ("SVM") cuts to be discussed below. After each BSP cut, two new groups are defined (or one if the other is discarded as an outlier) and are tested for efficient separation in 2.6, using a SVM. A successful separation needs a ratio of more than successful infeasible separation limit of the infeasible mapped points in the group correctly classified as infeasible, and that no larger ratio than failed feasible separation limit of all the mapped feasible points of the boundary incorrectly classified as infeasible. If this is not true, more BSP is performed on that group. BSP group limit tunes how small groups BSP can create. Setting this parameter to 10, for example, would mean that if a BSP cut results in a group with less than 10 points that group is also discarded even if the number of points is more than BSP discard limit of the size of the group where the cut is added.

Figure 15:
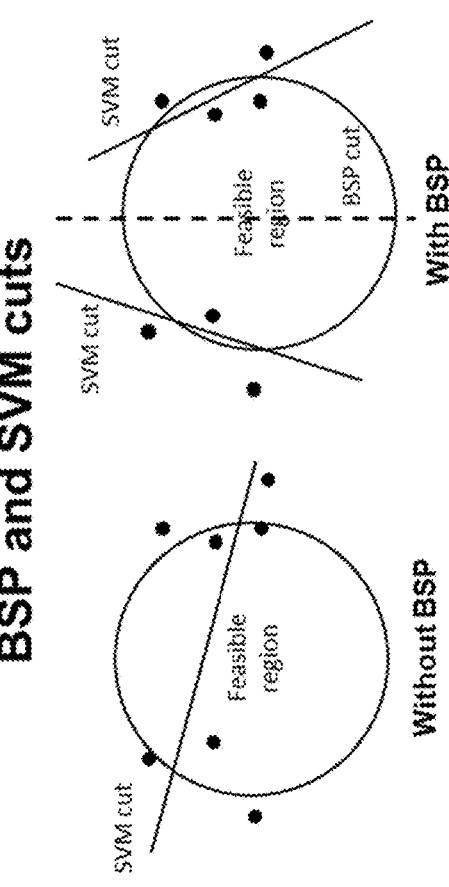
FIG. 15 depicts a result of the application of Support Vector Machines and Binary Space Partitioning according to one embodiment.

Referring to FIG. 15, the separation of point into two groups by a linear cut is performed using Support Vector Machines (SVM), which is widely used within AI. In machine learning, support-vector machines (SVMs, also support-vector networks) are supervised learning models with associated learning algorithms that analyze data for classification and regression analysis. See https://en.wikipedia.org/wiki/Support-vector machine incorporated by reference herein. Given a set of points and a binary variable, the SVM attempts to generate a cut which separate points based on the binary variable. In this case the binary variable will represent feasibility and linear SVM will be used. Generating an SVM cut requires a quadratic programming problem to be solved. The SVM cuts will create the linear inequalities stored in 2.7. For the purpose of this invention special care is aimed towards criteria for accepting the SVM cuts and can be tuned with the SVM cost parameter which governs to what degree misclassifications should be avoided in training. The best possible outcome would be to correctly classify all points. This will generally not be possible, so a relatively strict tolerance is employed in failed feasible separation limit at this stage to ensure that the cuts do not remove large parts of the feasible region. If a cut manages to classify all feasible points well enough the next focus is the classification of infeasible points. At this stage, the primary concern is to verify that all infeasible do not lie on the same side as the feasible points. This would imply that the cut provides no valuable information, and this is tuned with successful infeasible separation limit.

The process of creation of BSP and SVM cuts continues until all points have been either discarded or been used to create SVM cuts, which is checked in 2.8. The decision to keep discarded mapped points is governed by the parameter keep discarded points, and if active discarded points can be used the next time cuts are generated for this boundary. If no cuts were generated and all points discarded, cutting start limit should be increased for this boundary to map more points before the next attempt. Even after a boundary has been used to create cuts, it will continue to get points mapped to it for potentially creating more cuts in a later iteration. Successfulness in 1.7 is largely based on the mapped points and the convexity of the feasible region defined by the non-linear constraints, and in the intended purposes for this invention feasible regions will be convex. If the mapped points are too few to approximate any region of the boundary with linear cuts, more points are needed to have BSP not hit BSP group limit before achieving a good separation.

Figure 16:
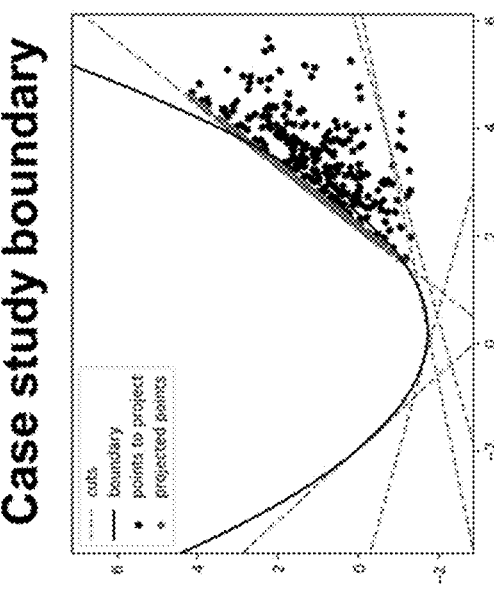
FIG. 16 depicts results of a case study applying the disclosed embodiments.
Figure 17:
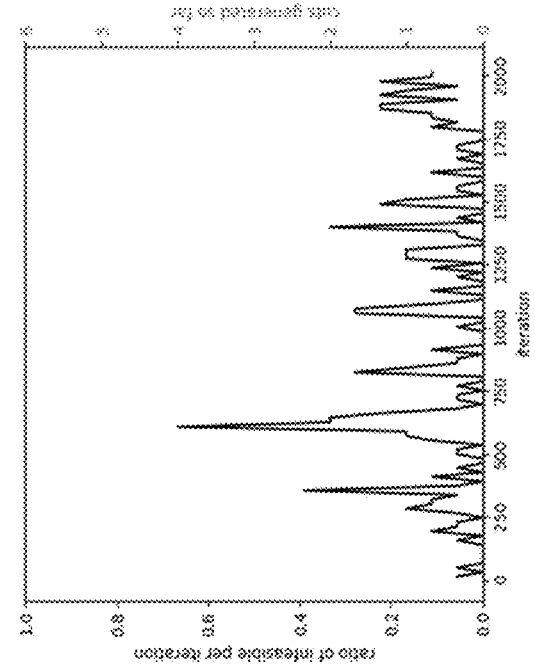
FIG. 17 depicts graphs comparing results of the operation of the disclosed embodiments.

To incorporate the cuts into the start or existing polytope, 1.8 in FIG. 12 "Process overview", they first need to be expressed on the same format as the inequalities being handled by Optimized Batched Polytope Projection. If the cuts to add are expressed as the inequality constraints $$C^c y^c \leq b \tag{1}$$

the addition of slack variables $lb^y \leq y^s \leq ub^y$, one for each inequality, gives $$Cy = 0 \tag{2}$$

where $y^T=[y^{cT}\ y^{sT}]$ and $C=[C^c\ I]$ so that one slack variable impacts one inequality. The bounds for each slack variable are selected to reflect b, so that if the equalities of (2) are fulfilled and the bounds of $y^s$ are fulfilled, the inequalities of (1) are fulfilled. From the above described Optimized Batched Polytope Projection, the matrix N is a matrix with orthonormal columns spanning the null space of A, the matrix describing the start or existing polytope. The significant computational upfront cost of Optimized Batched Polytope Projection described above is to create N. By suitably extending the matrices N and A to account for the added constraints and slack variables, one can reuse these results to find a new matrix B taking the role of N for less computational cost than re-creating N with the added constraints and slack variables from scratch. B holds the full data of the new combined polytope and can be saved to disk to save the upfront cost if further point batches are to be processed to the same start polytope and non-linear constraints. A case study has been constructed to illustrate how the disclosed embodiments allow for the approximation of non-linear boundaries. In this problem there is only one non-linear inequality constraint active and there is no start polytope. The nonlinear boundary consisted of a second-degree polynomial in 2 dimensions x, y, as can be seen in the image "Case study boundary". Note that the boundary is defined by $f(x,y)=0$ where $f(x,y)$ is the polynomial in question. If $f(x,y)<0$ then the point is infeasible and $|f(x,y)|$ serves as the measure of boundary distance. The parameters used for this example was:

boundary distance limit: 0.5% of initial objective value in the optimization problem to which batch processing was performed
  cutting start limit: 70
  BSP discard limit: 10%
  BSP group limit: 5
  successful infeasible separation limit: >0% (at least 1 infeasible correctly classified)
  failed feasible separation limit: 10%
  SVM cost parameter: 250
  keep discarded points: false Referring to FIGS. 16 and 17, batch processing was performed once without the invention and once with the invention. As can be seen in FIG. 17 "Case study iterations", generating cuts led to a reduction in infeasible points ratio per iteration which is shown by a lower curve in the right graph after the point of inserting cuts compared to the left graph showing the base case. Furthermore, in FIG. 16 "Case study boundary" it can also be seen how points were repaired using the five created cuts, which also highlights how the SVM cuts leads to a linear approximation of the non-linear boundary. In this case points were projected to the polytope without overshoot but Optimized Batched Polytope Projection will typically project with some overshoot.

Referring to FIG. 17, as a last note, lower values to cutting start limit and BSP group limit could potentially be used by one or more of the following methods, since more dimensions need more information or points to successfully generate cuts:

If a start polytope with equality constraints is provided, mapped points can be projected to a so-called null space of the constraint matrix defining the polytope, which would have a lower dimension, or fewer degrees of freedom, than the original solution space. With fewer dimensions to consider, fewer points can be used for each cut.

In either the original space or in the null space, dimensions where all points in consecutive batches are continuously close or equal to zero, could be assumed to continue to be close or equal to zero if the application admits it. These dimensions can then be ignored which also reduces the considered number of dimensions and fewer points can be used for each cut.

If there is prior knowledge of which dimensions that have an impact on a boundary, as input to the process, the other dimensions can be ignored. This will reduce the number of dimensions that need to be considered for this boundary both in the original space and in the null space, which again leads to fewer needed points for each cut.

The disclosed embodiments:
  Improve handling of either unknown or non-differentiable non-linear constraints in derivative free algorithms, leading to faster convergence, fewer needed iterations and less hardware usage;
  Decrease the number of points residing in the infeasible space during batch processing more and more over time;
  Consider only relevant parts of the boundaries, as the analysis of the boundaries is performed using the batches to be processed and during the processing, in contrast with sampling the full solution space prior to starting the analysis;
  Utilize a process to create and inject cuts into the existing polytope that can run in parallel to the batch processing, only creating a minor interruption when the cuts are incorporated, and the new polytope is made active; and
  Can be used seamlessly with Optimized Batched Polytope Projection which itself is a very computationally efficient way of handling batched polytope projection, making this innovation computationally efficient with that regard as well.

Figure 10:
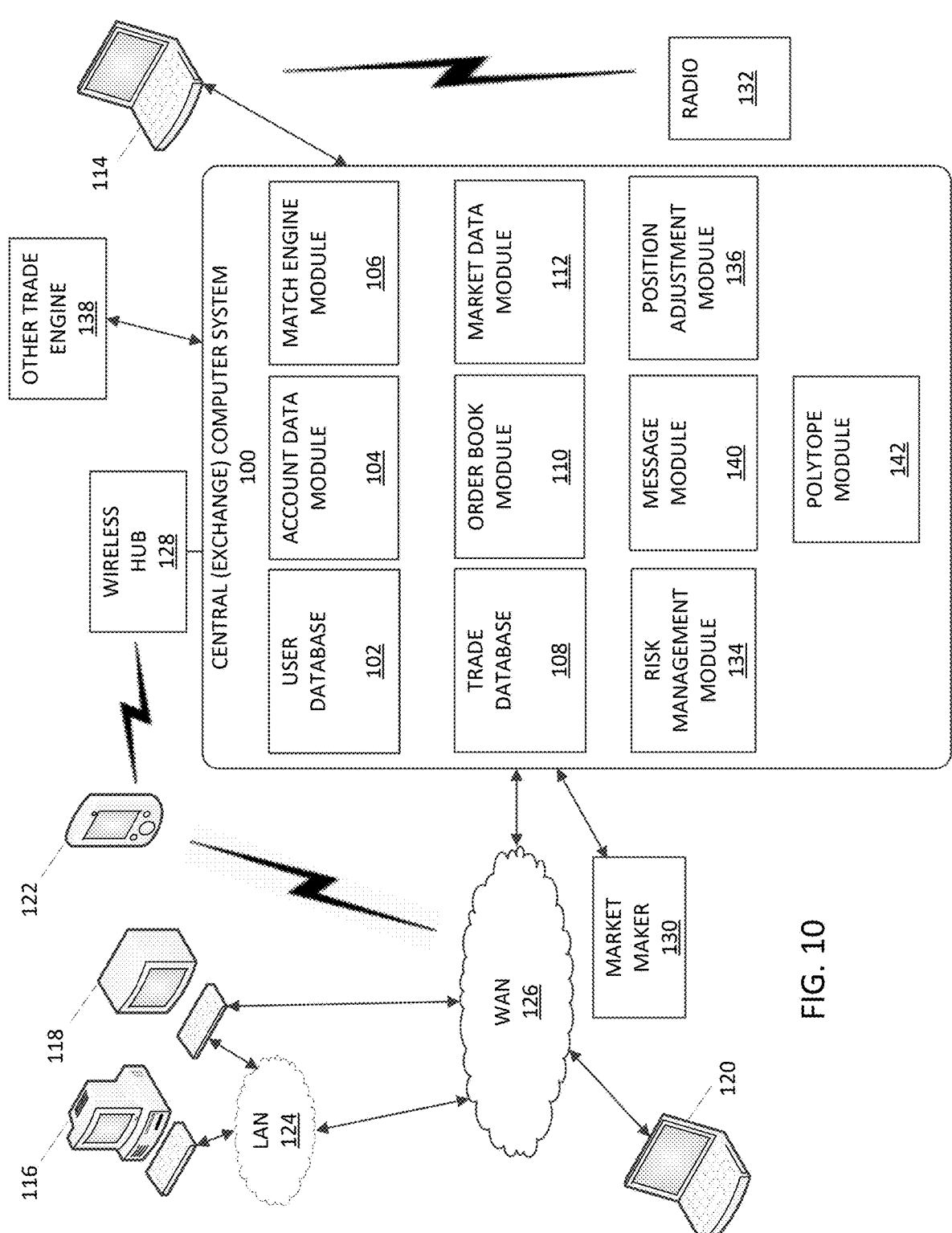
FIG. 10 depicts an illustrative computer network system for an exchange that may be used to implement aspects of the disclosed embodiments.

As an alternative to the computer system of FIG. 3, an exemplary trading network environment for implementing trading systems and methods for use with the disclosed embodiments is shown in FIG. 10. An Exchange Computer System 100 receives messages that include orders and transmits market data related to orders and trades to users, such as via wide area network 126 and/or local area network 124 and computer devices 114, 116, 118, 120 and 122, as will be described below, coupled with the Exchange Computer System 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The disclosed embodiments may be discussed in relation to futures and/or options on futures trading and/or bilateral instrument trading, and it may be appreciated that they may be applicable to any equity, options or futures trading system, e.g., Exchange, Electronic Communication Network ("ECN"), Alternative Trading System ("ATS"), or Swap Execution Facility ("SEF"), or market now available or later developed, e.g. cash, Futures, etc., as well as any instrument traded thereon. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trade orders, cancellation, etc., in a manner as expected by the market participants, such as based on market data, e.g. prices, available counter-orders, etc., to provide an expected level of certainty that transactions may occur in a consistent and predictable manner and without unknown or unascertainable risks. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g. that transactional integrity and efficiency are maintained.

Electronic trading systems ideally attempt to offer an objective, efficient, fair and balanced market where market prices reflect a true consensus of the value of products traded among the market participants, where the intentional or unintentional influence of human interaction may be minimized if not eliminated, and where unfair or inequitable advantages with respect to information access are minimized if not eliminated. The current systems ideally attempt to increase liquidity, decrease message volume, and increase matching performance.

An exchange provides one or more markets for the purchase and sale of various types of products including financial instruments such as stocks, bonds, futures contracts, options, swaps, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

In particular, electronic trading of financial instruments, such as futures contracts, may be conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled/completed) orders are maintained in one or more data structures or databases referred to as "order books," such orders being referred to as "resting," and made visible, i.e., their availability for trading is advertised, to the market participants through electronic notifications/broadcasts, referred to as market data feeds. An order book/data structure may be typically maintained for each product, e.g. instrument, traded on the electronic trading system and generally defines or otherwise represents the state of the market for that product, i.e. the current prices at which the market participants are willing to buy or sell that product. As such, as used herein, an order book for a product may also be referred to as a market for that product. A CLOB (Central Limit Order Book) may be a type of transparent order book system that matches customer orders.

Similar to exchange traded instruments, such as futures contracts, which involve purchase or sale of an obligation to occur at a later date, over-the-counter (OTC) products include financial instruments, i.e., derivatives, which involve obligations to occur at a later date but which are bought, sold, traded, exchanged, and/or swapped directly between counterparties instead of via an exchange. OTC products may further include periodic obligations, such as the periodic payment of interest, during the life of the position. OTC instruments include interest rate based instruments, such as forward swaps, interest rate swaps, described in more detail below, and currency based instruments, such as foreign exchange (FX) instruments.

Many OTC instruments/derivatives exist to fill a wide range of needs for the counterparties who buy and sell them, including limiting or mitigating exposure to risks and/or maximizing cash flow.

An interest rate swap (IRS) is an example of a type of OTC product where the parties agree to exchange streams of future interest payments, e.g., floating vs fixed interest rates, based on a specified principal or notional amount. Each stream, e.g., the floating rate stream and the fixed rate stream, may be referred to as a leg. Swaps are often used to hedge certain risks, for instance, interest rate risk. They can also be used for speculative purposes. An example of a swap includes a plain fixed-to-floating, or "vanilla," interest rate swap. The vanilla swap includes an exchange of interest streams where one interest rate stream is based on a floating rate and the other interest rate stream is based on a fixed rate. In a vanilla swap, one party makes periodic interest payments to the other based on a fixed interest rate. In return for the stream of payments based on the fixed rate, that party may receive periodic interest payments based on a variable rate from the other party. The payments are calculated over the notional amount defined in the contract. The variable rate may be linked to a periodically known or agreed upon rate for the term of the swap such as the London Interbank Offered Rate (LIBOR) or Secure Overnight Funding Rate (SOFR). This rate is called variable, because it is reset at the beginning of each interest calculation period to the then current reference rate, such as the LIBOR published rate.

The parties to an IRS swap generally utilize these exchanges to limit, or manage, exposure to fluctuations in interest rates, or to obtain lower interest rates than would otherwise be unobtainable. Usually, at least one of the legs to a swap has a variable rate. The variable rate may be based on any agreed upon factors such as a reference rate, the total return of a swap, an economic statistic, etc. Other examples of swaps include total return swaps, and Equity Swaps. The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment. Currently, financial institutions, such as banks, trade interest rate payments and/or interest rate swaps over the counter. Streams of future payments must be valued to determine a current market price. The market value of a swap is the sum of the difference between the present value of the future fixed cash flows and the floating rate and the price of the swap is determined based on the fixed rate. Because the fixed rate of a particular swap is determined based on the available fixed rate at the time the price is struck, which frequently changes, the fixed rates associated with two different swaps will rarely be the same.

In the exemplary embodiments, all transactions for a particular market may be ultimately received at the electronic trading system via one or more points of entry, e.g. one or more communications interfaces, at which the disclosed embodiments apply determinism, which as described may be at the point where matching occurs, e.g. at each match engine (where there may be multiple match engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g. matching, of those transactions/orders as will be described. See U.S. patent application Ser. No. 14/074,675, filed on Nov. 7, 2013, published as U.S. Patent Application Publication No. 2015/0127516, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a match engine, e.g. a hardware matching processor match engine module 106, as will be described in detail below, will attempt to identify a previously received but unsatisfied order counter thereto, i.e. for the opposite transaction (buy or sell) in the same financial instrument at the same or better price (or, as will be described, other fixed parameter such as delta) (but not necessarily for the same quantity unless, for example, either order specifies a condition that it must be entirely filled or not at all). Previously received but unsatisfied orders, i.e. orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process, which may further be used to generate market data transmitted to the market participants. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e. market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. For example, an order for a volatility options quoted contract may be matched against another suitable order for that contract. However, it may also be matched against suitable separate counter orders for the premium quoted options or futures found in their respective CLOBs (both the premium quoted and the volatility quoted being related to another using a pricing model). This is referred to as "implication" where a given order for a financial instrument may be matched via a combination of suitable counter orders for instruments which share common, or otherwise interdependent, financial variables.

The order for a particular instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

In general, advertising implied opportunities will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

A futures calendar spread may be composed of a long or short position in the futures in one expiration cycle and a position with the opposite sign in a different expiration. Example: short one contract of February natural gas and buy one contract of April natural gas. The profit or loss to a futures calendar position depends on changes in the prices of the contracts, and because the two contracts are on the same underlying asset the profitability of the spread will depend more specifically on changes in the term structure of the futures curve. In this example, if the prices of both contracts decline, but the February contract declines more, the position will make a profit.

An options calendar spread may be composed of two contracts with the same underlying asset, the same right (call or put), the same strike price, and different expiration months. This sort of calendar spread is typically opened at the same time by buying one option and selling the other, e.g. by selling at the money call in the first expiration cycle and buying at the money call in the second expiration cycle. While a futures calendar is affected by changes in the prices of the futures contracts, an options calendar is affected not just by price changes but also by changes in implied volatility. In fact, a short calendar (sell the longer dated option and buy the nearer one) is one of the simpler ways to gain long volatility exposure using options.

Receiving a bid for the implied book may create multiple orders in the explicit books. In certain embodiments, the exchange system (and the match engine(s)) are configured to imply across more than three order books. As illustrated in the calendar spread scenarios, the exchange system may create implied books or imply across spreads.

Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Exchange Computer System, as will be described below, monitors incoming orders received thereby and attempts to identify, i.e., match or allocate, as will be described in more detail below, one or more previously received, but not yet matched, orders, i.e. limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e. a market order to buy or sell at a price for which there are currently no resting orders. In particular, if the incoming order is a bid, i.e. an offer to buy, then the identified order(s) will be an ask, i.e. an offer to sell, at a price that is identical to or higher than the bid price. Similarly, if the incoming order is an ask, i.e. an offer to sell, the identified order(s) will be a bid, i.e. an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e. the order has been filled. If any quantity of the incoming order remains, an entry may be created in the order book database and information regarding the incoming order is recorded therein, i.e. a resting order is placed on the order book for the remaining quantity to await a subsequent incoming order counter thereto.

Traders access the markets on a trading platform using trading software that receives and displays at least a portion of the order book for a market, i.e. at least a portion of the currently resting orders, enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the Exchange Computer System identifies that an incoming market order may be filled by a combination of multiple resting orders, e.g. the resting order at the best price only partially fills the incoming order, the Exchange Computer System may allocate the remaining quantity of the incoming order, i.e. that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the Exchange for multiple financial products. Similarly, if the Exchange Computer System identifies multiple orders contra to the incoming limit order and that have an identical price which may be favorable to the price of the incoming order, i.e. the price is equal to or better, e.g. lower if the incoming order is a buy or higher if the incoming order is a sell, than the price of the incoming order, the Exchange Computer System may allocate the quantity of the incoming order among such identified orders in accordance with the matching algorithms as, for example, may be defined in the specification of the particular financial product or defined by the Exchange for multiple financial products.

In certain embodiments, the allocation or matching algorithms may take into consideration if the order is "real" (explicit or implicit). As discussed below, these algorithms may include multiple strategies that may be presented transparently to the customers so that they may be aware of how the match engine operates. Since implied orders are synthetically created (and not received), they may not correspond to the FIFO strategy. In such a scenario, the implied orders may be treated as junior to the real orders. Alternatively, the match engine may treat the implied order as an extension of the original real order and give the implied order the same time priority. These scenarios and others are described below.

As was noted above, an Exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g. unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

One exemplary system for matching is described in U.S. patent application Ser. No. 13/534,499, filed on Jun. 27, 2012, entitled "MULTIPLE TRADE MATCHING ALGORITHMS," published as U.S. Patent Application Publication No. 2014/0006243 A1, incorporated by reference herein, discloses an adaptive match engine which draws upon different matching algorithms, e.g. the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g. a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e. when the market is closed, such that when the market reopens, a new trading algorithm is in effect for the particular product. As will be described, the disclosed embodiments may facilitate more frequent changes to the matching algorithms so as to dynamically adapt to changing market conditions, e.g. intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may be considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the Exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) may not get their orders filled. It can be seen from the above descriptions of the matching/allocation algorithms that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader may be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they may receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, Exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata. The hybrid system discussed above switches between FIFO and pro rata based on a condition of the market.

The exchange computer system 100 may be implemented with one or more mainframe, desktop or other computers, such as the example computer 200 described below with respect to FIG. 5. A user database 102 may be provided which includes information identifying traders and other users of exchange computer system 100, such as account numbers or identifiers, usernames and passwords. The exchange computer system 100 further includes various modules which may be implemented as individual components, e.g. hardware and/or software components, interconnected via an internal network or bus or common processing architecture (not shown) and may include an account data module 104 which may process account information that may be used during trades. A match engine module 106 may be included to match bid and offer prices and may be implemented with software that executes one or more algorithms for matching bids and offers. A match engine module/match engine/match processor 106 may be a hardware matching processor which is part of a transaction processing system. A data transaction processing system in which data items are transacted by a hardware matching processor that matches electronic data transaction request messages for the same one of the data items based on multiple transaction parameters from different client computers over a data communication network. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. A risk management module 134 may be included to compute and determine a user's risk utilization in relation to the user's defined risk thresholds. The risk management module 134 may define one or more constraints based on the user's risk requirements. These requirements may be set by a third party external to the Exchange Computer System 100, but also may be set by the Exchange Computer System 100.

The polytope module 142 may define a constraint polytope based on the risk requirements received from the risk management module 134 as described above. The polytope module 143 projects a set of data points representing a proposed set of transactions for the user to the constraint polytope to determine whether the set of points represent a solution to the constraint polytope for the risk requirements. As described in examples described herein, a dynamic matrix is adjusted based on the projection and applied to a subsequent iteration for a different set of points. This process is repeated according to solution requirements that require less than a perfect solution for the constraint polytope.

The position adjustment module 136 calculates one or more position adjustments or transactions based on the set of points for the solution that meets the solution requirements. The position adjustments may be based on positions associated with or proposed for the user at the Exchange Computer System 100.

The message module 140 is configured to generate one or more messages in response to the position adjustments from the position adjustment module. The messages may be notifications that are sent to the user regarding one or more transactions needed to meet the risk requirements. The messages may include initiation message that are sent for processing by the order book module 110 and/or match engine module 106 to cause the transactions to be performed. That is, the transactions may be performed automatically in order to meet the risk requirements. The message may include the one or more transactions for the solution to the constraint polytope to one or more external devices. The messages may be margin requirement messages that describe a reduction in a margin requirement achieved based on the one or more transactions.

In an embodiment, the message module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example, the modules may be embodied as part of an Exchange Computer System 100 for financial instruments.

The trading network environment shown in FIG. 10 includes exemplary computer devices 114, 116, 118, 120 and 122 which depict different exemplary methods or media by which a computer device may be coupled with the Exchange Computer System 100 or by which a user may communicate, e.g., send and receive, trade or other information therewith. It should be appreciated that the types of computer devices deployed by traders and the methods and media by which they communicate with the Exchange Computer System 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 11, may include a central processor that controls the overall operation of the computer and a system bus that connects the central processor to one or more conventional components, such as a network card or modem. Each computer device may also include a variety of interface units and drives for reading and writing data or files and communicating with other computer devices and with the Exchange Computer System 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 11 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the Exchange Computer System 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 4, an exemplary wireless personal digital assistant device ("PDA") 122, such as a mobile telephone, tablet based computer device, or other wireless device, may communicate with the LAN 124 and/or the Internet 126 via radio waves, such as via Wi-Fi, Bluetooth® and/or a cellular telephone based data communications protocol. PDA 122 may also communicate with exchange computer system 100 via a conventional wireless hub 128.

FIG. 10 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 5 and described below with respect thereto.

As was described above, the users of the Exchange Computer System 100 may include one or more market makers 130 which may maintain a market by providing constant bid and offer prices for a derivative or security to the Exchange Computer System 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 10 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Of course, numerous additional servers, computers, hand-held devices, personal digital assistants, telephones and other devices may also be connected to exchange computer system 100. Moreover, one skilled in the art will appreciate that the topology shown in FIG. 4 is merely an example and that the components shown in FIG. 4 may include other components not shown and be connected by numerous alternative topologies.

As shown in FIG. 10, the Exchange Computer System 100 includes a message module 140 which may implement, in conjunction with the market data module 112, the disclosed mechanisms for initiating electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 11:
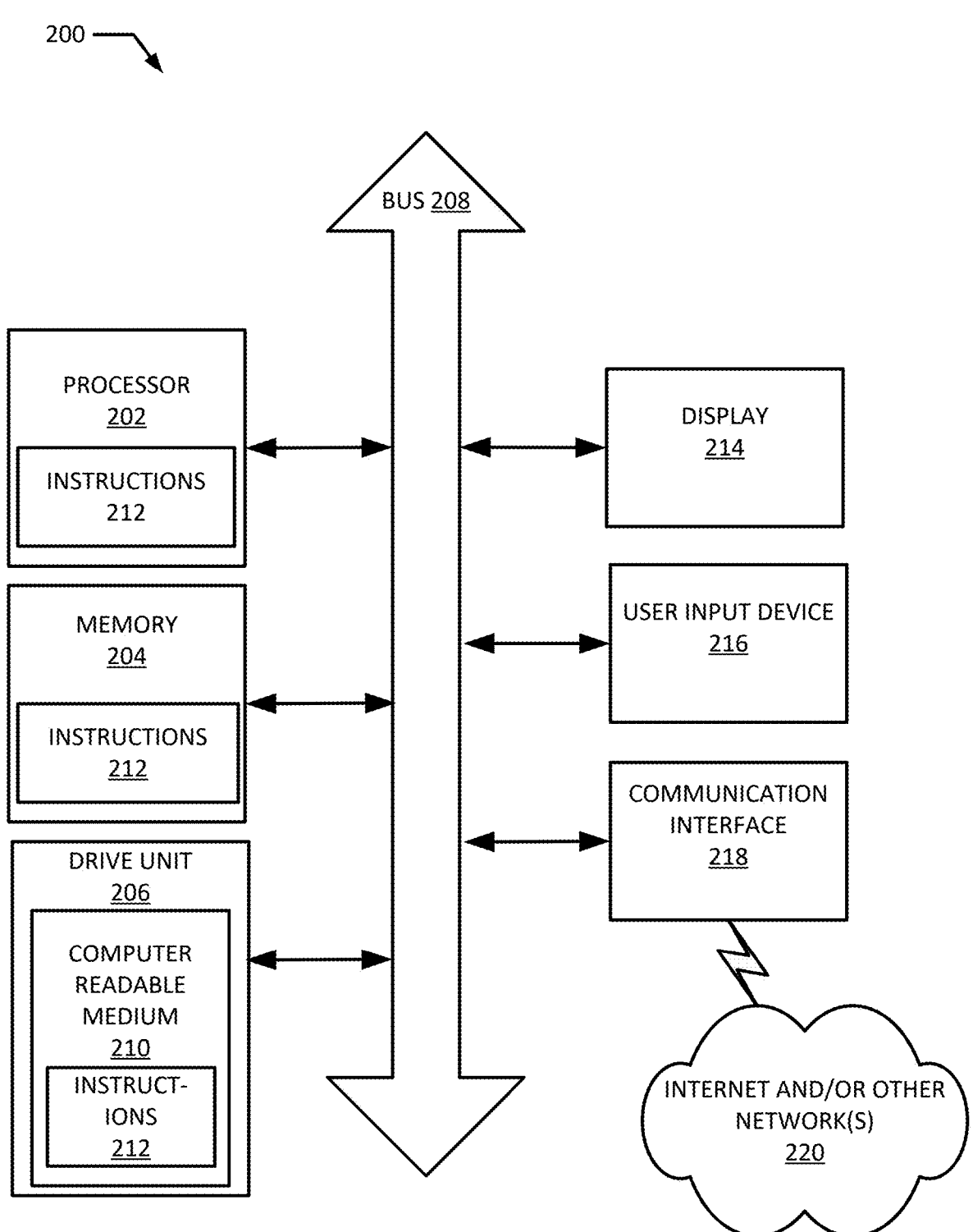
FIG. 11 depicts an illustrative embodiment of a general computer system for use with the disclosed embodiments.

Referring to FIG. 11, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 11, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 11, the computer system 200 may also include a disk or optical drive unit 206. The computer system 200 may implement any of the embodiments described herein. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The memory 204 may also include a database comprising data indicative of a constraint polytope. The memory 204 may include matrices defining inequalities for the constraint polytope. Each row may define a particular inequality and have a number of elements equivalent to the number of dimensions in the inequality and/or the constraint polytope.

The communication interface 218 is configured to receive a first point batch from an external computer system. The first point batch includes a plurality of data points representing transactions. The transactions may be potential trades between two or more entities. The trade may alter a risk or a position for a portfolio for the entities.

The processor 202 is an example polytope controller configured to analyze the plurality of data points and perform a projection attempt of the plurality of data points to the constraint polytope and generate a dynamic adjustment for a second point batch for the constraint polytope in response to the projection attempt. The dynamic adjustment may include a vector having one or more values for each dimension of the constraint polytope and/or corresponding to each inequality of the constraint polytope. The processor 202 is configured to analyze the second point batch in response to the dynamic adjustment to identify one or more transactions as a solution for the constraint polytope. Additional adjustments are determined and additional point batches may be analyzed until the solution requirements are met or until an iteration limit is reached.

The user input device 216 is configured to receive at least one user selected fail rate threshold, feasibility tolerance, or other solution requirements followed by the polytope controller in performing the projection attempt of the data points on the constraint polytope. The user input device 216 may receive a user input for the iteration limit, which may be a quantity of iteration or a computation time limit for the iterations.

The communication interface 218 is further configured to send a message including the identified one or more transactions for the solution to the constraint polytope to one or more external devices.

The display 214 is configured to present data indicative of the projection attempt. The data indicative of the projection attempt may include a listing of the inequalities in the constraint polytope are met by the one or more transactions determined by the polytope controller. The data indicative of the projection attempt may include the proportion or a number of the inequalities in the constraint polytope are met by the one or more transactions determined by the polytope controller. The data indicative of the projection attempt may include a listing of the transactions needed for the determined solution. The data indicative of the projection attempt may include a value for a margin requirement reduction associated with the determined solution.

As described above, the disclosed embodiments enable the disclosed polytope controller/module 142 to handle one or more non-linear constraints when performing adaptive data point projection to identify an optimal feasible solution using a constraint polytope. For each batch of data points (solution sets) to be processed, the disclosed embodiments iteratively subdivide the feasible region using a hyperplane to create an additional linear constraint, approximating the non-linear constraint, to carve out regions defined by a non-linear constraint and reduce the feasible region which does not affect the solution. Points outside the feasible region defined by the original constraints and added hyperplanes are projected into the feasible region.

During the batch processing of the polytope, the disclosed system samples the data points of the batch undergoing processing to identify those which most closely define a boundary of the non-linear constraint, wherein only those identified data points from each batch are stored. Once a sufficient number of data points have been stored which define the boundary of the non-linear constraint, the disclosed embodiments, iteratively partition those stored data points using Binary Space Partitioning, discarding small and/or outlier partitions, until an efficient partitioning is found, and then apply a Support Vector Machine to generate a cut/hyperplane, i.e., linear approximation of the non-linear constraint, which best separates the infeasible and feasible data points. This cut/hyperplane is then integrated back into the constraint polytope as an added constraint, e.g., by expressing the cut as a linear inequality constraint and adding it to the already calculated matrix which defines the constraint polytope (thereby saving computational resources). Wherein the batch processing of the constraint polytope continues to process additional batches, with the newly added constraint, to identify the optimal solution set based thereon. The generating of the cuts for each non-linear constraint may be performed in parallel with the batch polytope processing, which pauses only when the polytope needs to be updated to incorporate the newly generated constraint.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for calculation of an estimation solution satisfaction of a constraint polytope having a non-linear constraint, the method comprising:

initializing, by a processor implementing a polytope controller, the constraint polytope;

receiving, by the processor implementing the polytope controller, a plurality of point batches from an external computer system, each point batch including a plurality of data points each representing a set of transactions, wherein the plurality of data points include both feasible and infeasible data points;

for each received point batch:

projecting, by the processor implementing the polytope controller, at least a subset of the plurality of data points to the constraint polytope to modify parameters of the sets of transactions of the infeasible data point so as to render them feasible;

mapping, by the processor implementing the polytope controller, the plurality of data points relative to a boundary defined by the non-linear constraint and storing, in a memory coupled with the polytope controller, a subset of the plurality of data points characterized by a distance from the boundary less than a first threshold value;

determining, by the processor implementing the polytope controller, whether a number of stored data points exceeds a second threshold value, wherein if the number of stored data points does not exceed the second threshold value, performing the projecting and mapping on a subsequently received point batch;

wherein if the number of stored data points exceeds the second threshold value, performing, by the processor implementing the polytope controller, Binary Space Partitioning (BSP) on the stored data points to partition the stored points into two partitions, wherein if a number of data points in either of the two partitions is less than a third threshold value, the partition is discarded;

for each remaining of the two partitions, generating, by the processor implementing the polytope controller using a Support Vector Machine (SVM), a linear approximation of the non-linear constraint which classifies the most feasible data points from the most non-feasible data points of the partition;

determining, by the processor implementing the polytope controller, whether a number of correctly classified infeasible data points therein exceeds a fourth threshold and a number of incorrectly classified feasible data points does not exceed a fifth threshold, wherein if the fourth threshold is not exceeded or the fifth threshold is exceeded, the BSP and subsequent linear approximation using the SVM is performed again on the partition, and otherwise storing the generated linear approximation in the memory;

generating, by the processor implementing the polytope controller using a Support Vector Machine, a linear approximation of the non-linear constraint which divides the most feasible data points from the most non-feasible data points of the partition, and storing the generated linear approximation in the memory;

updating, by the processor implementing the polytope controller, the constraint polytope with an additional constraint comprising the linear approximation;

determining, by the processor implementing the polytope controller, whether the projection satisfies the constraint polytope; and generating, by the processor implementing the polytope controller, a dynamic adjustment for use with a second point batch for the constraint polytope; and wherein some points in each batch are discarded when outside of a boundary and as more and more batches are processed, the processor learns about the boundary thereby decreasing the discard rate over time, without the need to recalculate the internal states of the linear constraints of the constrain polytope.

2. The computer implemented method of claim 1, wherein initializing the batch iteration for the constraint polytope comprises:

generating at least one internal structure for the constraint polytope.

3. The computer implemented method of claim 2, wherein the at least one internal structure includes a linear inequality.

4. The computer implemented method of claim 1, wherein initializing the batch iteration for the constraint polytope comprises:

defining default values for an adaptive mechanism.

5. The computer implemented method of claim 1, wherein initializing the batch iteration for the constraint polytope comprises:

determining an acceptable fail rate for a proportion of the plurality of data points projected within the constraint polytope.

6. The computer implemented method of claim 1, wherein initializing the batch iteration for the constraint polytope comprises:

determining a feasibility tolerance for a quantity of the plurality of data points that exceeds an inequality of the constraint polytope.

7. The computer implemented method of claim 1, further comprising:

receiving the second point batch including a second plurality of data points;

analyzing the second plurality of data points;

performing a second projection of the second plurality of data points to the constraint polytope;

determining whether the second projection satisfies the constraint polytope; and generating a second dynamic adjustment for use with a third point batch for the constraint polytope.

8. The computer implemented method of claim 1, wherein a time complexity for the projection of a batch approximates $O(n)$.

9. The computer implemented method of claim 1, wherein a time complexity for the projection is less than a time complexity for a quadratic optimization projection to the constraint polytope.

10. The computer implemented method of claim 1, wherein a time complexity for the initialization of the constraint polytope is $O(mn^2)$ or $O(n^3)$.

11. The computer implemented method of claim 1, further comprising:

determining an optimal set of values for the first point batch based on the dynamic adjustment.

12. The computer implemented method of claim 1, wherein a time complexity of the projection is proportionate to a number of inequalities of the constraint polytope after initialization.

13. An apparatus for calculation of an estimation solution within a constraint polytope, the apparatus comprising:

a database comprising data indicative of a constraint polytope;

a communication interface configured to receive a point batch from an external computer system, the point batch including a plurality of data points representing transactions; and a polytope controller implemented by a processor coupled with the database and the communications interface and configured to analyze the plurality of data points for a projection attempt of the plurality of data points to the constraint polytope and generate a dynamic adjustment for use with at least one subsequent point batch for the constraint polytope in response to the projection attempt; and the polytope controller further configured to use the constraint polytope, sample during batch processing, use the sample to generate a linear approximation of a non-linear constraint and combine the linear approximation with already existing linear constraints;

wherein some points in each batch are discarded when outside of a boundary and as more and more batches are processed, the processor learns about the boundary thereby decreasing the discard rate over time, without the need to recalculate the internal states of the linear constraints of the constrain polytope.

14. The apparatus of claim 13, wherein the polytope controller further configured to:

map the plurality of data points relative to a boundary defined by the non-linear constraint and store, in a memory coupled with the polytope controller, a subset of the plurality of data points characterized by a distance from the boundary less than a first threshold value;

determine whether a number of stored data points exceeds a second threshold value, wherein if the number of stored data points does not exceed the second threshold value, perform the projection and mapping on a subsequently received point batch;

wherein if the number of stored data points exceeds the second threshold value, perform Binary Space Partitioning (BSP) on the stored data points to partition the stored points into two partitions, wherein if a number of data points in either of the two partitions is less than a third threshold value, the partition is discarded;

for each remaining of the two partitions, generate, using a Support Vector Machine (SVM), a linear approximation of the non-linear constraint which classifies the most feasible data points from the most non-feasible data points of the partition;

determine whether a number of correctly classified infeasible data points therein exceeds a fourth threshold and a number of incorrectly classified feasible data points does not exceed a fifth threshold, wherein if the fourth threshold is not exceeded or the fifth threshold is exceeded, the BSP and linear approximation using the SVM is performed again on the partition, and otherwise the generated linear approximation is stored in the memory; and update the constraint polytope with an additional constraint comprising the linear approximation.

15. The apparatus of claim 13, further comprising:

a user input device coupled with the processor and configured to receive at least one user selection for a fail rate threshold or a feasibility tolerance.

16. The apparatus of claim 15, wherein the fail rate threshold defines a limit for a proportion of the plurality of data points projected within the constraint polytope.

17. The apparatus of claim 15, wherein the feasibility tolerance defines a limit for a quantity of the plurality of data points that exceeds an inequality of the constraint polytope.

18. The apparatus of claim 13, further comprising:

a display coupled with the processor and configured to present data indicative of the projection attempt.

19. The apparatus of claim 13, wherein the polytope controller is configured to analyze the at least one subsequent point batch in response to the dynamic adjustment to identify one or more transactions as a solution within the constraint polytope.

20. The apparatus of claim 19, wherein the communication interface is further configured to send a message including the identified one or more transactions for the solution to the constraint polytope to one or more external devices.

21. A non-transitory computer readable medium including instructions that when executed by a processor are configured to cause the processor to perform:

initializing, at a polytope controller, a constraint polytope;

receiving, at the polytope controller, a plurality of point batches from an external computer system, each point batch including a plurality of data points representing transactions, wherein the plurality of data points include both feasible and infeasible data points;

for each received point batch:

projecting, at the polytope controller, at least a subset of the plurality of data points to the constraint polytope to modify parameters of the sets of transactions of the infeasible data point so as to render them feasible;

mapping, at the polytope controller, the plurality of data points relative to a boundary defined by the non-linear constraint and storing, in a memory coupled with the polytope controller, a subset of the plurality of data points characterized by a distance from the boundary less than a first threshold value;

determining, at the polytope controller, whether a number of stored data points exceeds a second threshold value, wherein if the number of stored data points does not exceed the second threshold value, performing the projecting and mapping on a subsequently received point batch;

wherein if the number of stored data points exceeds the second threshold value, performing, at the polytope controller, Binary Space Partitioning (BSP) on the stored data points to partition the stored points into two partitions, wherein if a number of data points in either of the two partitions is less than a third threshold value, the partition is discarded;

for each remaining of the two partitions, generating, at the polytope controller using a Support Vector Machine (SVM), a linear approximation of the non-linear constraint which classifies the most feasible data points from the most non-feasible data points of the partition;

determining, at the polytope controller, whether a number of correctly classified infeasible data points therein exceeds a fourth threshold and a number of incorrectly classified feasible data points does not exceed a fifth threshold, wherein if the fourth threshold is not exceeded or the fifth threshold is exceeded, the BSP and linear approximation using the SVM is performed again on the partition, otherwise storing the generated linear approximation in the memory;

updating, at the polytope controller, the constraint polytope with an additional constraint comprising the linear approximation;

determining, at the polytope controller, whether the projection satisfies the constraint polytope; and generating, at the polytope controller, a dynamic adjustment for use with a second point batch for the constraint polytope; and wherein some points in each batch are discarded when outside of a boundary and as more and more batches are processed, the processor learns about the boundary thereby decreasing the discard rate over time, without the need to recalculate the internal states of the linear constraints of the constrain polytope.

* * * * *